United States Patent
DeLine et al.

(10) Patent No.: US 6,877,888 B2
(45) Date of Patent: Apr. 12, 2005

(54) MODULAR REARVIEW MIRROR ASSEMBLY

(75) Inventors: Jonathan E. DeLine, Holland, MI (US); Roger L. Veldman, Holland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/739,766

(22) Filed: Dec. 18, 2003

(65) Prior Publication Data

US 2004/0145904 A1 Jul. 29, 2004

Related U.S. Application Data

(60) Continuation of application No. 10/134,775, filed on Apr. 29, 2002, now Pat. No. 6,672,744, which is a continuation of application No. 09/526,151, filed on Mar. 15, 2000, now Pat. No. 6,386,742, which is a division of application No. 08/918,772, filed on Aug. 25, 1997, now Pat. No. 6,124,886.

(51) Int. Cl.$^7$ .......................... B60Q 1/26; F21V 33/00
(52) U.S. Cl. .................. 362/494; 362/140; 362/141; 362/135; 362/503
(58) Field of Search ................. 362/494, 140, 362/141, 135, 503

(56) References Cited

U.S. PATENT DOCUMENTS

| | | | |
|---|---|---|---|
| 2,414,223 A | 1/1947 | De Virgilis | 240/4.2 |
| 4,443,057 A | 4/1984 | Bauer et al. | 350/281 |
| 4,646,210 A | 2/1987 | Skogler et al. | 362/142 |
| 4,733,336 A | 3/1988 | Skogler et al. | 362/142 |
| 4,807,096 A | 2/1989 | Skogler et al. | 362/142 |
| 4,886,960 A | 12/1989 | Molyneux et al. | 250/209 |
| 4,930,742 A | 6/1990 | Schofield et al. | 248/475.1 |
| 4,973,844 A | 11/1990 | O'Farrell et al. | 250/341 |
| 5,140,455 A | 8/1992 | Varaprasad et al. | 359/275 |
| 5,151,816 A | 9/1992 | Varaprasad et al. | 359/275 |
| 5,178,448 A | 1/1993 | Adams et al. | 362/83.1 |
| 5,327,288 A | 7/1994 | Wellington et al. | 359/606 |
| D351,370 S | 10/1994 | Lawlor et al. | D12/187 |

(Continued)

FOREIGN PATENT DOCUMENTS

| | | |
|---|---|---|
| DE | 9306989.8 | 7/1993 |
| DE | 4415885 A1 | 11/1995 |

(Continued)

OTHER PUBLICATIONS

N.R. Lynam, "Electrochomic Automotive Day/Night Mirror," *SAE Technical Paper Series*, 870636 (1987).

(Continued)

Primary Examiner—Stephen Husar
Assistant Examiner—James W Cranson
(74) Attorney, Agent, or Firm—Van Dyke, Gardner, Linn & Burkhart, LLP

(57) ABSTRACT

An interior rearview mirror assembly for vehicles incorporates a reflective mirror element for viewing by a user of the mirror assembly, a lip formed from moldable polymeric resin selected to expand sufficiently when heated to allow snap in insertion of the reflective mirror element while the lip is warm and flexible, a carrier located to the rear of the reflective element such that the carrier is closer to a windshield of the vehicle than the mirror element when the mirror element is mounted in the vehicle, at least one electrical accessory, and an electrical connector adapted to receive a connector from the vehicle electrical system with the electrical accessory connected to the electrical connector. Preferably, the electrical accessory is supported by the carrier and is selected from a variety of electrical devices, lamps, lights, sensors and the like.

69 Claims, 16 Drawing Sheets

U.S. PATENT DOCUMENTS

| | | | |
|---|---|---|---|
| 5,521,760 A | 5/1996 | De Young et al. | 359/601 |
| 5,530,240 A | 6/1996 | Larson et al. | 250/214 |
| 5,570,127 A | 10/1996 | Schmidt | |
| 5,572,354 A | 11/1996 | Desmond et al. | 359/265 |
| 5,576,687 A | 11/1996 | Blank et al. | 340/438 |
| 5,615,857 A | 4/1997 | Hook | 248/549 |
| 5,632,551 A * | 5/1997 | Roney et al. | 362/485 |
| 5,649,756 A | 7/1997 | Adams et al. | 362/83.1 |
| 5,666,167 A | 9/1997 | Tults | |
| 5,669,698 A | 9/1997 | Veldman et al. | 362/83.1 |
| 5,671,996 A | 9/1997 | Bos et al. | 362/83.1 |
| 5,689,241 A | 11/1997 | Clarke, Sr. et al. | |
| 5,708,410 A | 1/1998 | Blank et al. | |
| 5,786,772 A | 7/1998 | Schofield et al. | 340/903 |
| 5,796,094 A | 8/1998 | Schofield et al. | 250/208.1 |
| 5,798,575 A | 8/1998 | O'Farrell et al. | 307/10.1 |
| 5,820,245 A | 10/1998 | Desmond et al. | 362/83.1 |
| 5,910,854 A | 6/1999 | Varaprasad et al. | 359/273 |
| 5,971,552 A | 10/1999 | O'Farrell et al. | 359/871 |
| 6,000,823 A | 12/1999 | Desmond et al. | 362/494 |
| 6,124,886 A | 9/2000 | DeLine et al. | 348/148 |
| 6,166,625 A | 12/2000 | Teowee et al. | 340/426 |
| 6,386,742 B1 | 5/2002 | DeLine et al. | |

FOREIGN PATENT DOCUMENTS

| | | |
|---|---|---|
| EP | 06 15882 A2 | 9/1994 |
| EP | 0667254 A1 | 8/1995 |
| EP | 0788947 A1 | 8/1997 |
| GB | 2292857 A | 3/1996 |
| GB | 2297632 A | 8/1996 |
| IE | 970014 | 1/1997 |
| JP | 7277072 | 10/1995 |
| WO | WO 9412368 A | 6/1994 |
| WO | WO 9419212 | 9/1994 |
| WO | WO 9427262 | 11/1994 |

OTHER PUBLICATIONS

N.R. Lynam, "Smart Windows for Automobiles," *SAE Technical Paper Series*, 900419 (1990).

N.R. Lynam and A Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

European Search Report for European Patent Application No. 98650054.4–1523 of Dec. 9, 1998.

* cited by examiner

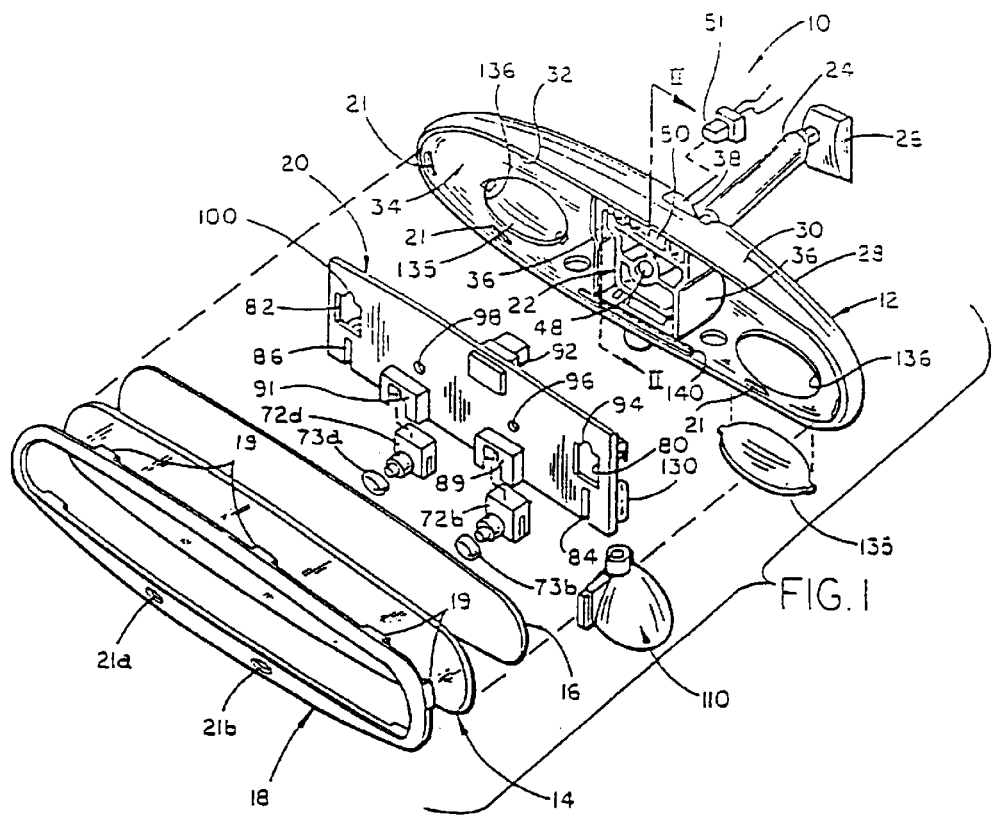
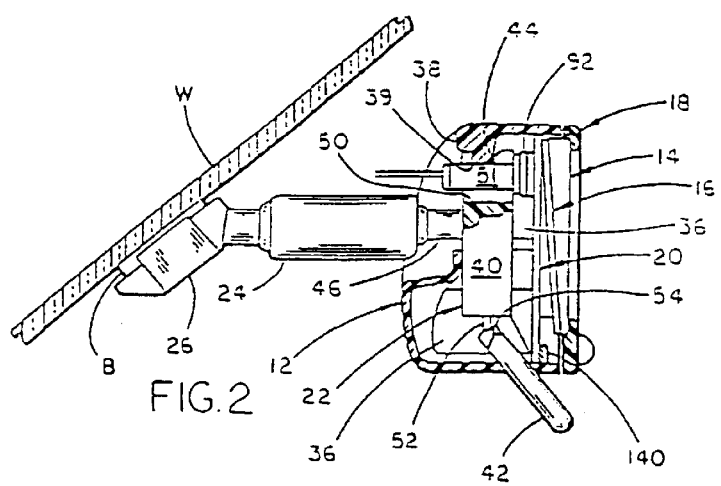

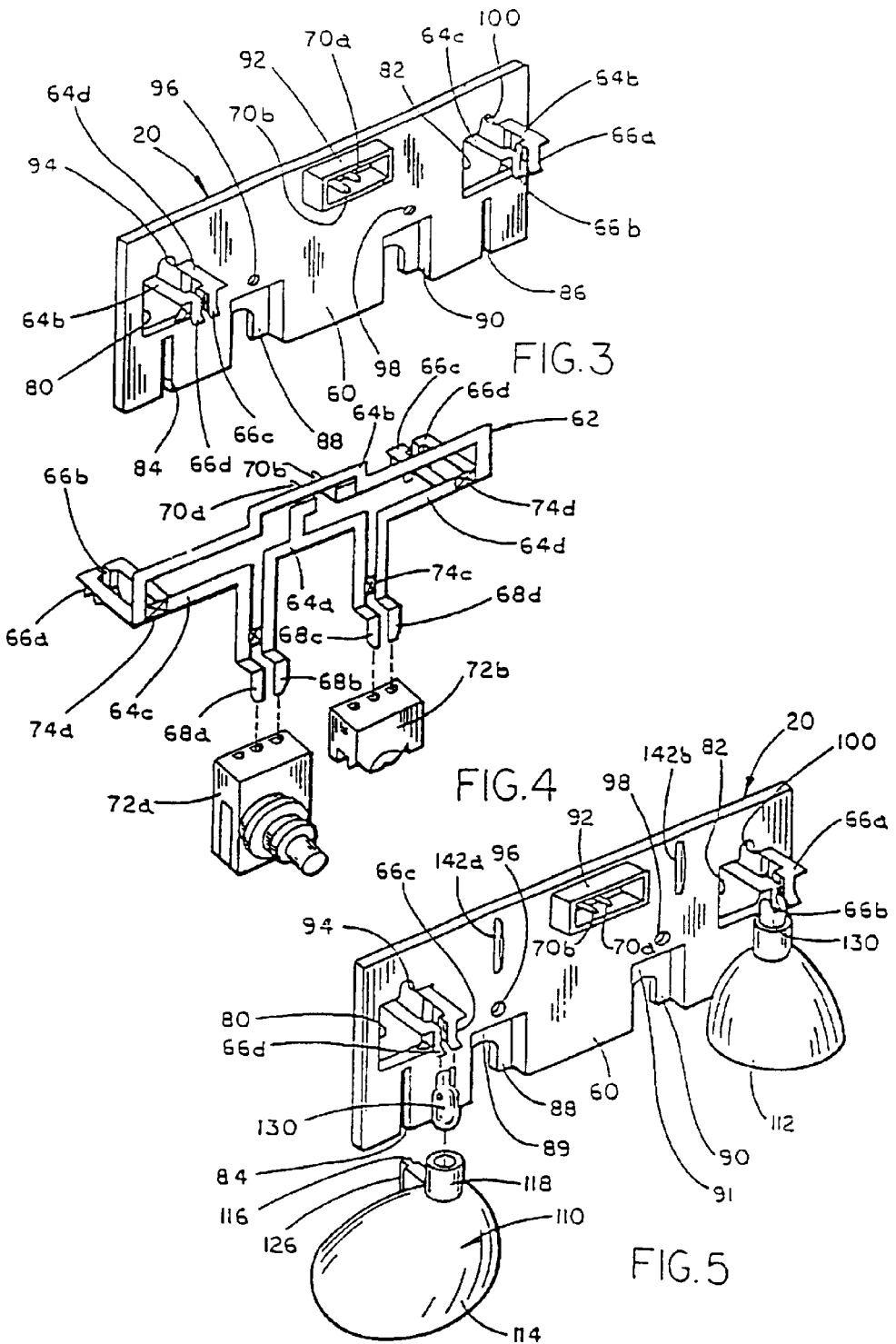

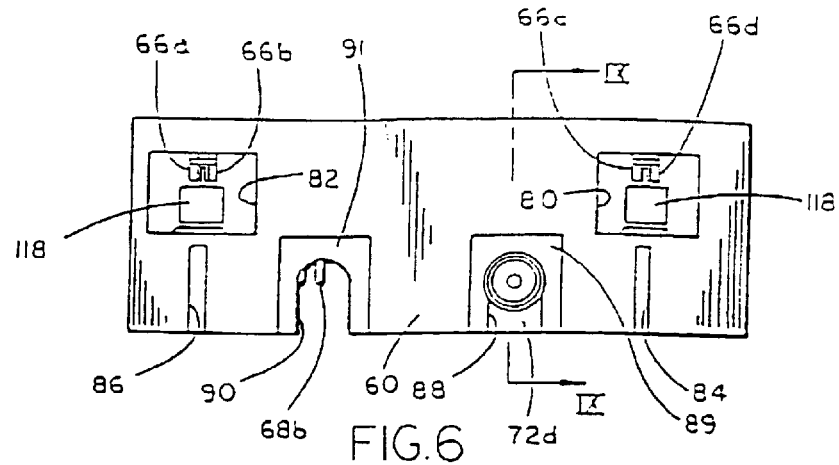
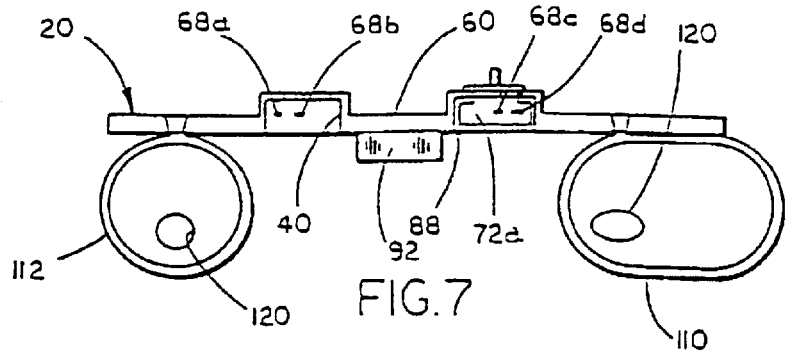
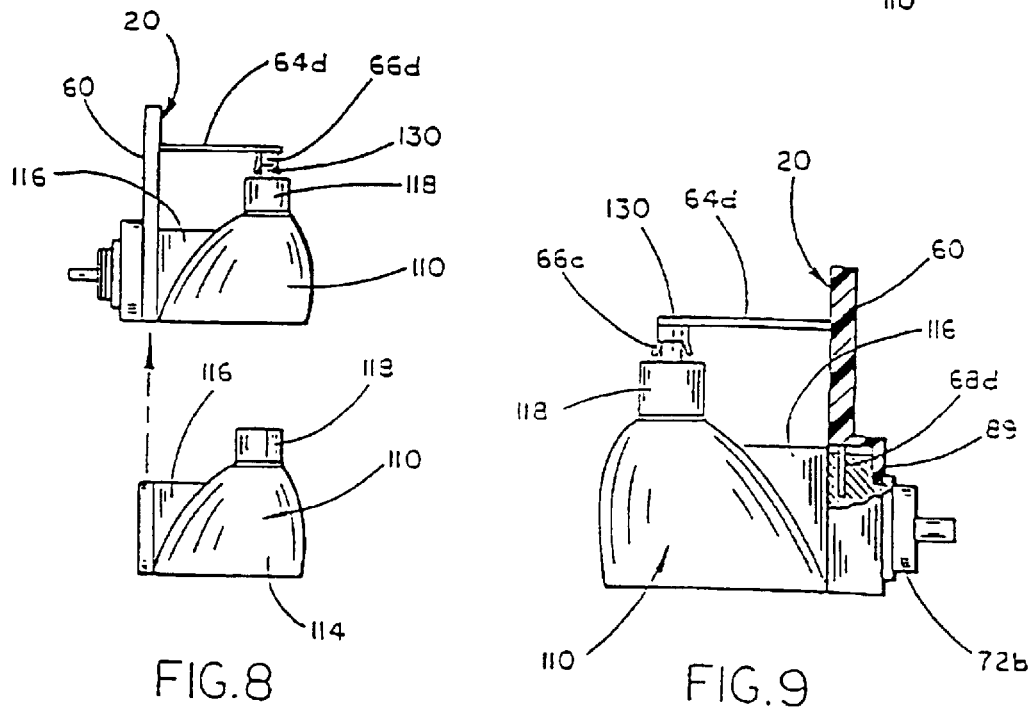

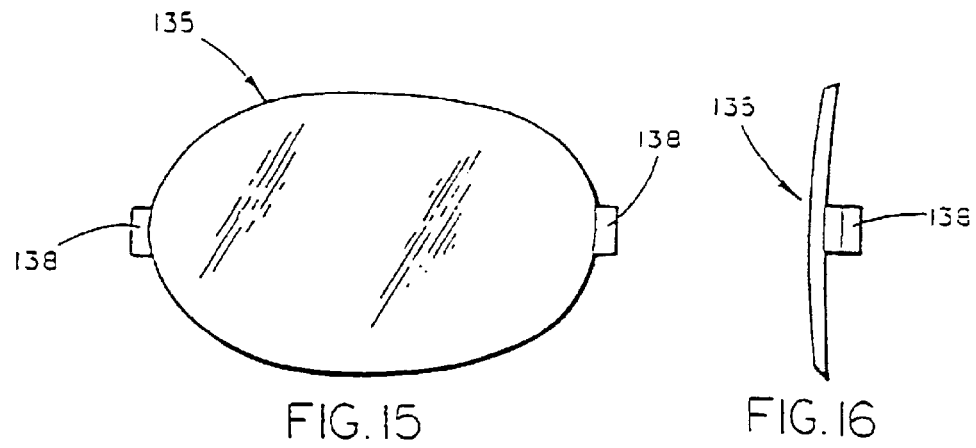
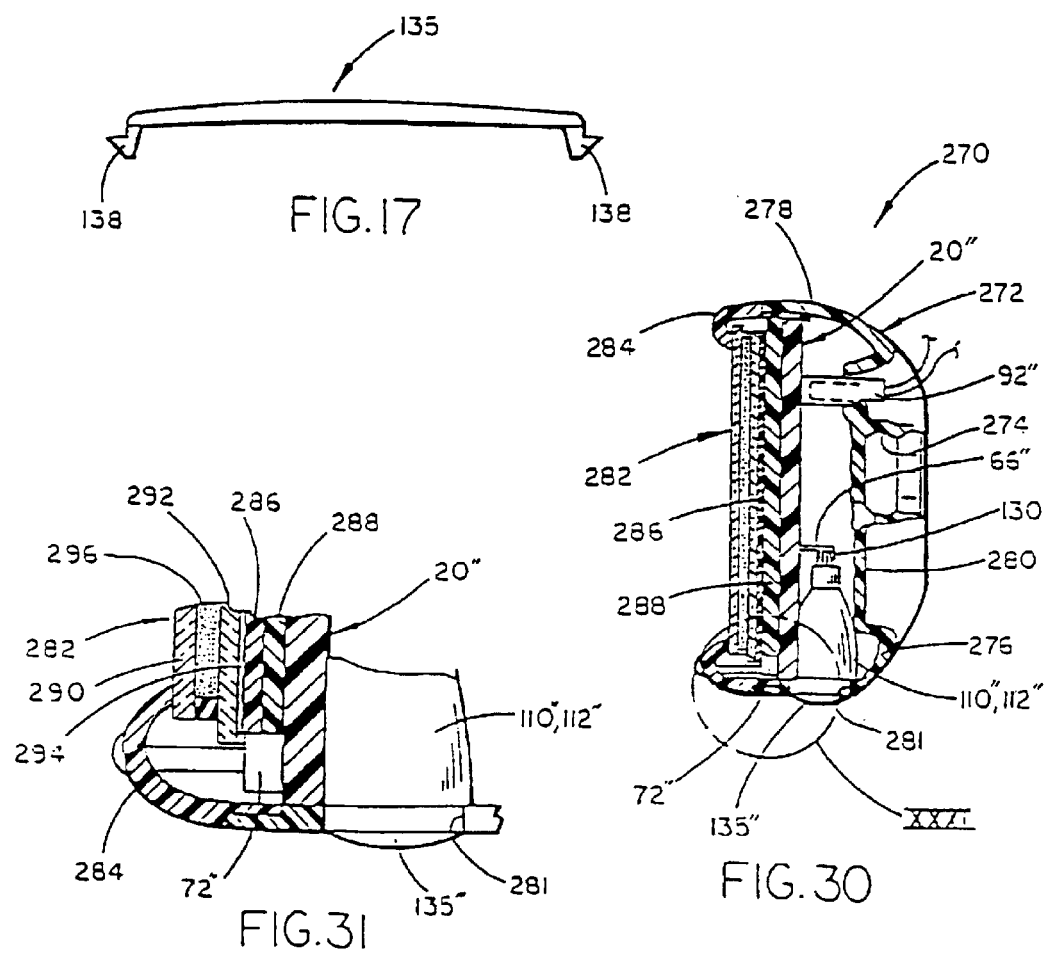

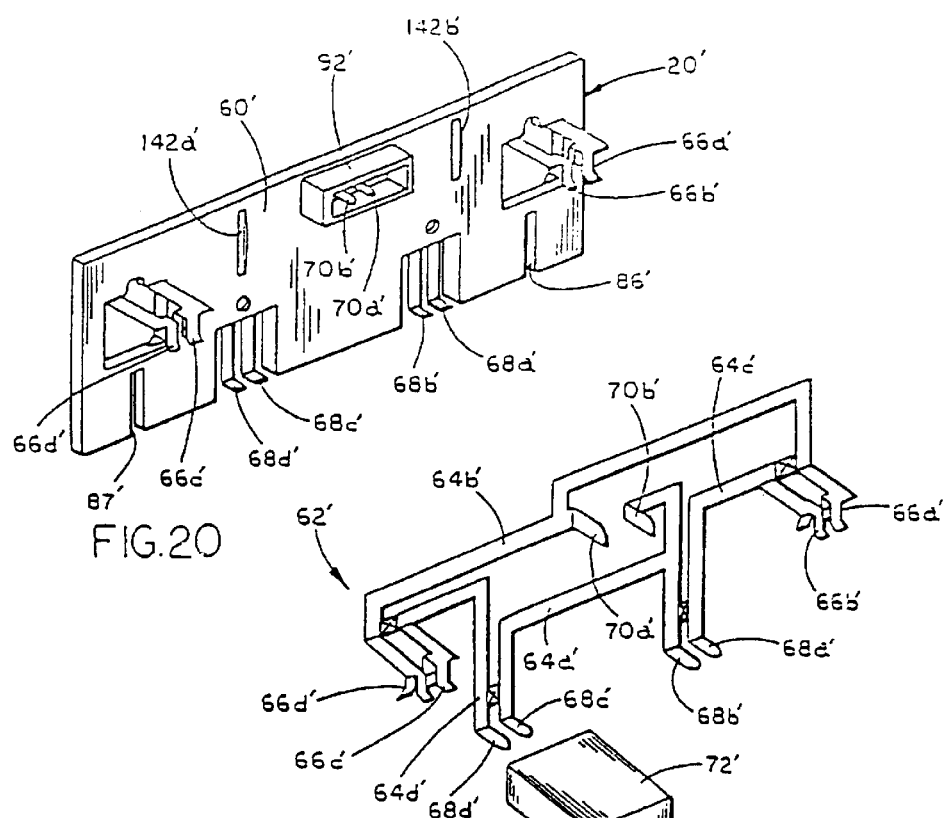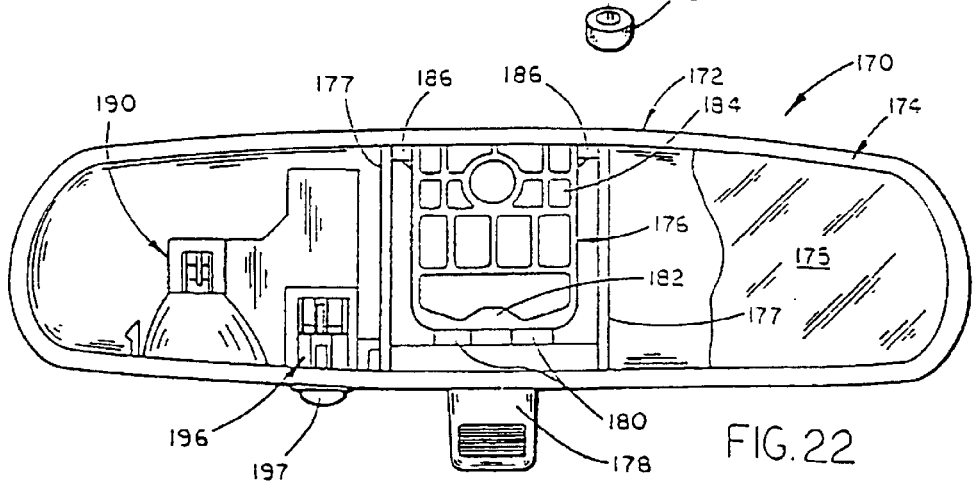

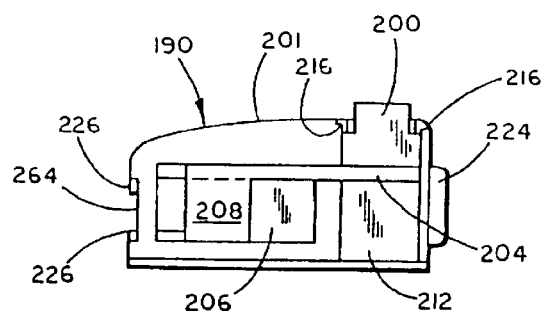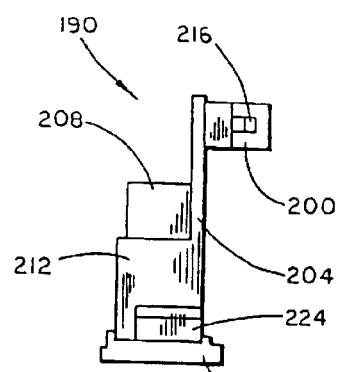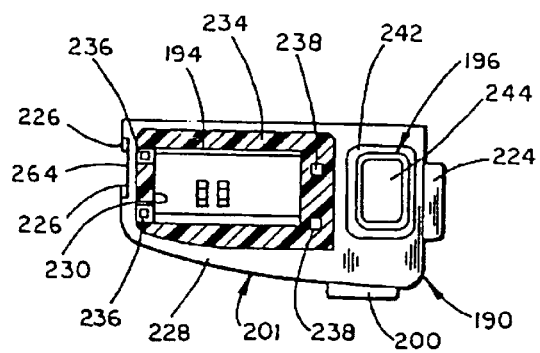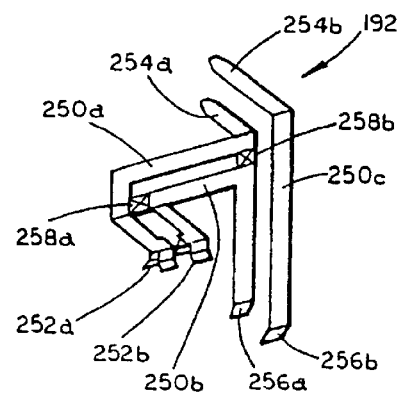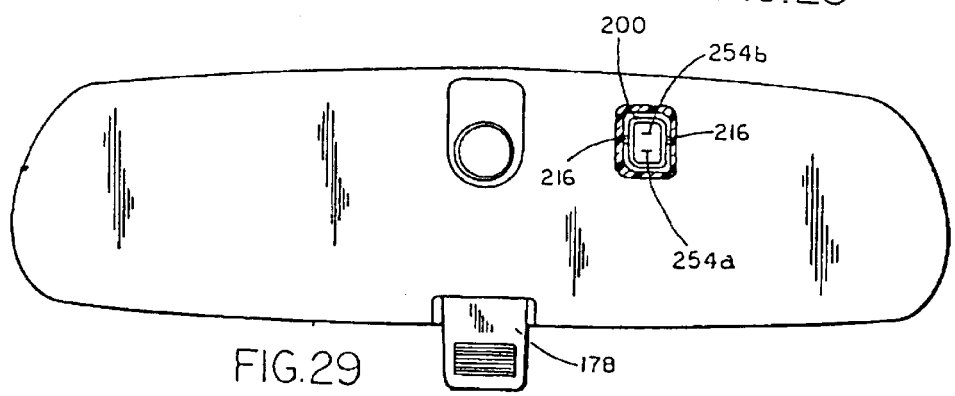

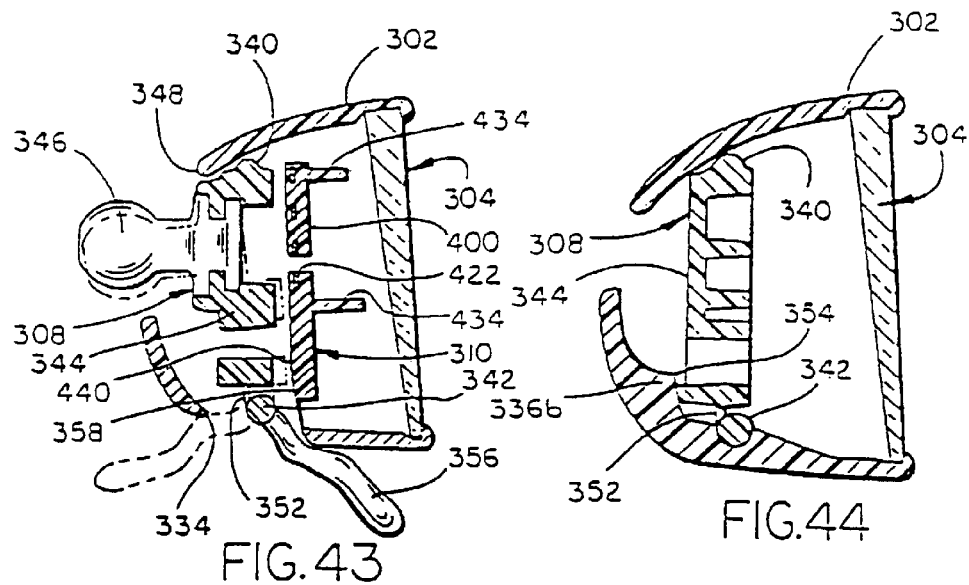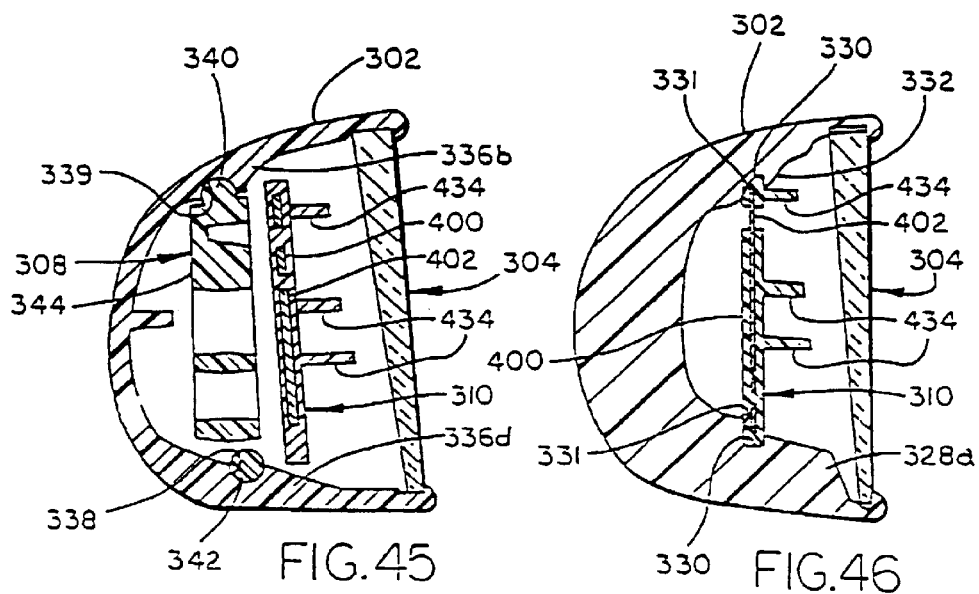

MODULAR REARVIEW MIRROR ASSEMBLY

CROSS REFERENCE TO RELATED APPLICATION

This is a continuation of U.S. patent application Ser. No. 10/134,775, filed Apr. 29, 2002 now U.S. Pat No. 6,672,744, by Jonathan E. DeLine, Roger L. Veldman and Niall R. Lynam, entitled MODULAR REARVIEW MIRROR ASSEMBLY, which is a continuation of Ser. No. 09/526,151 filed Mar. 15, 2000, now U.S. Pat. No. 6,386,742, issued May 14, 2002, which is a division of U.S. patent application Ser. No. 08/918,772, filed Aug. 25, 1997, now U.S. Pat. No. 6,124,886, issued Sep. 26, 2000, the disclosures of which are hereby incorporated by reference herein.

BACKGROUND OF THE INVENTION

This invention relates to rearview mirrors for vehicles and, more particularly, to an improved, modular rearview mirror assembly incorporating electrical components such as lamps and switches within the assembly for illumination of various portions of the vehicle interior, displays or other instruments of various types all of which are mounted and assembled via an integrated carrier member.

Prior rearview mirror assemblies for vehicles incorporating lamp assemblies with map or reading lights, switches, or other instrumentation such as compasses, light sensors and controls therefor, while functioning well for their intended purposes, have been relatively complicated, involved and expensive to manufacture on a high volume basis. More specifically, many operations have been necessary to properly assemble the various parts in a rearview mirror housing or case having such additional features to arrive at the desired product. These various parts have, in many cases, been difficult and tedious to handle and position requiring high intensity, expensive manual labor which has prevented the cost of such assemblies from being reduced.

For example, in the lighted rearview mirror assembly of U.S. Pat. Nos. 4,733,336 and/or 5,178,448, a molded plastic case is provided with a day/night toggle actuator and a support arm for mounting the assembly on a windshield mounted button, header support or the like. In order to manufacture that assembly, the day/night toggle actuator and support arm must be mounted within the case followed by insertion of appropriate reflector housings, and a wire harness/assembly incorporating a plug receptacle for mounting on the mirror housing, appropriate lamp or bulb holders, and appropriate switches, all of which must be inserted and mounted within the case. The wire harness/assembly itself requires separate assembly prior to insertion in the mirror housing so as to incorporate the necessary switches, bulb holders, plug connection and soldered or clip-type wire joints. These many connections and handling requirements create numerous possibilities for failure and improper wiring. In addition, the above assembly procedures have required extraordinary amounts of assembly time and manual labor, thereby driving up or preventing reductions in the cost of such assemblies.

The above assembly procedures have also restricted and/or prevented use of certain types of rearview mirror housings or cases. For example, the use of molded, polymeric rearview mirror housings in which a prismatic mirror element is snapped in place after molding of the housing and while the housing was still in a warm, somewhat soft and pliable state was very difficult because of the required assembly time for inserting the lamps, reflectors, bulb holders, plug connections, switches, wiring harnesses and the like, all before insertion of the reflective prism in sufficient time to allow a shrink fit of the mirror case around the mirror element.

In addition, prior commercially successful lighted mirrors formed from resinous plastic materials have also typically required the use of temperature resistant, high heat deflection temperature resins in order to withstand the high levels of heat generated therewithin by the lamps and other electrical components. Such temperature resistant resins are higher in cost making such assemblies more expensive.

Accordingly, an improved rearview mirror assembly for vehicles incorporating lamp assemblies or other electrical components such as instrumentation or controls, and an improved manufacturing method was desired for simplified assembly, increased reliability, increased heat management, reduction in assembly time, and flexibility for use with different types and styles of mirror housings and cases.

SUMMARY OF THE INVENTION

The present invention provides an improved modular rearview mirror assembly for vehicles incorporating lamps or other electrical components, instrumentation and/or controls which provides an economical assembly useful with many different mirror case shapes and housing styles with resultant increased durability and reliability, improved heat management, as well as reduced manufacturing complexity and time. In addition, an improved manufacturing method for making such modular rearview mirror assemblies is also provided.

In one aspect, the invention provides a modular rearview mirror assembly for vehicles including a case for supporting a mirror element, the case having at least one opening therethrough, a reflective mirror element supported and retained by the case, and a support on the assembly for mounting the assembly on a vehicle. A modular carrier member is formed separately from and mounted on the case. The carrier member includes an electrically conductive circuit member and a support body. The circuit member is formed separately from and secured to the support body, and provides an integral support, electrical connections for, and an electrical distribution network to at least one lamp on the case. A lamp is mounted on the carrier and connected to the circuit member and is adapted to provide light through the case opening to a portion of the vehicle when the mirror assembly is mounted therein.

In another aspect of the invention, the invention provides a modular rearview mirror assembly for vehicles including a mirror case, reflective mirror element, support for mounting the assembly on a vehicle and a modular carrier member all as set forth above. In this aspect of the invention, however, the carrier member provides an integral support, electrical connections for, and an electrical distribution network to at least one electrical component on the case. The case includes an electrical component mounted on the carrier member, which component is connected to the circuit member for operation on the mirror assembly. In a preferred form of this aspect of the invention, the carrier member also includes an electrical switch connected to the circuit member for controlling operation of the electrical component. Preferably, that switch is accessible for operation at the exterior surface of the mirror case.

Other preferred features of the invention include the provision of a reflector for reflecting light from the lamp through the case opening for illuminating portions of the interior of the vehicle such as the driver seating area, passenger seating area or both. The carrier member may also include an electrical switch, and a lens over the light opening. In preferred forms of the invention, a pair of lamps and openings through the mirror case are provided, each having a reflector and electrical switch for controlling same, as well as a lens over the opening.

The invention may be used with various types of rearview mirror cases such as those using a preformed bezel for retaining the mirror element within the case, the electrical switches for the lamps being accessible through the front of such bezel. Alternately, this invention makes commercially possible the molding of a one-piece mirror housing where a preformed, premolded lip is formed in one-piece on a molded resinous mirror case to allow snap-in insertion of a mirror element while the case is still warm and flexible and wherein the electrical switches for controlling the lamps are accessible from the bottom of the mirror assembly. Such one-piece housings are preferably made from polyolefin resins such as polypropylene or polypropylene/polyethylene copolymers having lower heat deflection temperatures, higher material shrinkage rates, and lower cost. A plug connection to a power source external of the mirror assembly may also be provided for access through an opening in the case. Mirror cases for both interior and exterior use on a vehicle are also contemplated.

In a preferred form, the circuit member of the present invention is preferably integrally molded to be at least partially encapsulated and/or encased within a resinous, polymeric support body preferably by insert molding to form the carrier member such that various sets of electrical connections extend from the molded body for connection to switches, light bulbs or other electrical components. The reflectors used with the lamps in the invention may be separately molded with metalized reflective surfaces and removably mounted to the carrier member in alignment with the lamp or light bulb, or may be formed from metal and inserted in an appropriate receptacle in the carrier member. Both regular and compound parabolic reflector shapes are contemplated.

In another preferred form of the invention, the carrier member may provide a single lamp and reflector which illuminates both the driver and passenger seating areas in the front of the vehicle. In this form, the carrier member includes a lamp or light bulb, reflector, switch, integral circuit member and plug receptacle for connection to an external power source all in a single unit which may be removably inserted from the exterior of the case, either before or after mounting of the reflective mirror element. This form allows repair and servicing of the lamp and carrier member following manufacture.

In yet another preferred form of the invention, the carrier member includes an edge portion defining a recess while the circuit member includes a bulb holder within the recess. A reflector is secured to the carrier member and received in the recess. The recess edge portion engages and supports the reflector while the lamp includes a bulb mounted within the recess. The reflector reflects light from the bulb through the case opening. This form of the invention allows the reflectors to be interchanged and selected depending on the positioning of the light to be provided by the rearview mirror assembly and depending, for example, on whether the vehicle in which the mirror assembly is installed is designed for left or right hand drive.

In other forms of the invention, the rearview mirror assembly may include a prismatic reflective mirror element and a day/night actuator mounted for movement between day and night positions on the case to modify the amount light reflected by the mirror element to the eye of the viewer. In this form, the carrier member includes a stop area for engaging the actuator in one of the day and night positions to limit movement of the day/night actuator. Preferably, the day/night actuator is pivotally mounted on an internal wall which includes a second stop area for engaging the actuator in the other of the day and night positions to limit movement of the actuator in that position.

In addition, the case may include internal, reinforcing walls each including slots receiving a portion of the carrier member to secure the carrier member within the case. In this form, the carrier member may include recessed camming surfaces for facilitating insertion of the carrier member into the slotted internal walls.

Further, in yet other forms of the invention, the carrier member may include a plug connection for receiving an electrical plug to connect the circuit member to an external power source and a latch member adapted to engage the plug when connected to the plug connection to retain the plug in the plug connection.

In addition, the carrier member may include a diode connected to the circuit member for reducing current leakage and battery drain when the assembly is connected to the electrical system of a vehicle.

In yet another aspect of the invention, a method for assembling a modular rearview mirror for vehicles includes the steps of providing a mirror case for supporting a reflective mirror element and a lamp for illuminating a portion of a vehicle, forming a modular carrier member by securing a separate electrically conductive circuit member to a non-electrically conductive, insulating support body, forming a subassembly by connecting the lamp to the modular carrier member to provide both support and electrical connections for the lamp, mounting the modular carrier member and lamp subassembly on the mirror case such that the lamp is in registry with an opening in the case, and mounting a reflective mirror element on the mirror case such that the modular carrier member is concealed on the mirror case while the lamp is positioned to provide illumination through the opening in the case when the rearview mirror is mounted on a vehicle. The carrier member is preferably molded using any of injection molding, compression molding, extrusion molding, reaction injection molding or casting. The carrier member may also be formed in two sections which are fastened together at least partially around the circuit member, or by forming the support body and attaching the preformed circuit member to at least one surface of the support body.

Accordingly, the present invention provides simplified assembly of lighted and other rearview mirror assemblies having electrical components therein by incorporating a separately formed carrier member providing an integrated subassembly module which allows the docking and assembly of differing reflectors, bulbs, switches, external electrical connectors, or other electrical components to adapt use of the board to differing mirror case shapes and housings. The carrier member is easy to grasp and install and avoids tangling, breaking and disconnection of individual wires as in previously known wire harness assemblies. The carrier member will receive differing reflectors for different vehicles to provide different illumination areas and angles, can be provided with receptacles for receipt of integrated circuit boards, allows the use of integral molding of switch bodies therein, and is easily adapted for use with either two-piece bezel-type or one-piece, snap-in, molded mirror cases and housings. The reflectors are highly efficient and reduce heat generated in the assembly by allowing use of less powerful lamps which, in turn, allows use of lower heat deflection temperature resins which are cheaper and provide one-piece molding capabilities. The carrier member can also be molded in different configurations for each specific type of vehicle so as to mount lamps or light bulbs at particular angles and positions required for each vehicle. The carrier member also allows assembly within differing mirror housings to provide different variations in mirror styling while also providing increased utility, especially using slotted internal walls which firmly secure the carrier member against vibration and movement within the mirror housing or case. In addition, when mounted in a day/night rearview mirror assembly using a toggle actuator, the carrier member provides a strengthening member or reinforcement to maintain the toggle actuator in place in the event of impact from airbag inflation, and may also serve as a stop for limiting movement of the actuator to one of its day or night positions. Also, the invention provides for latching a plug connection to the circuit member, and the use of a diode on the circuit member to reduce battery drain from the vehicle electrical system.

These and other objects, advantages, purposes and features of the invention will become more apparent from a study of the following description taken in conjunction with the drawings.

BRIEF DESCRIPTION OF THE DRAWINGS

FIG. 1 is an exploded, perspective view of a first embodiment of the modular rearview mirror assembly for vehicles of the present invention;

FIG. 2 is a sectional end elevation of the mirror assembly of FIG. 1 taken along line II—II of FIG. 2;

FIG. 3 is a perspective view of a preferred form of the carrier member for use in the mirror assembly of FIGS. 1 and 2;

FIG. 4 is an exploded, perspective view of a preferred form of a stamped metal electrical circuit adapted for insert molding within the carrier member of FIG. 3 and illustrating plug-in attachment of preferred plunger switches thereto;

FIG. 5 is an exploded, perspective view of the carrier member of FIG. 3 incorporating light bulbs and reflectors for same;

FIG. 6 is a front elevation of the carrier member of FIGS. 3 and 5 from the side opposite that shown in those figures;

FIG. 7 is a bottom plan view of the carrier member assembly shown in FIG. 5;

FIG. 8 is an end elevation of the carrier member assembly showing a method for attachment of a reflector to the carrier member;

FIG. 9 is a sectional end elevation of the carrier member assembly taken along plane IX—IX of FIG. 6;

FIG. 15 is a bottom plan view of a lens element for use in the present invention;

FIG. 16 is an end elevation of the lens of FIG. 15;

FIG. 17 is a side elevation of the lens of FIG. 15;

FIG. 20 is a perspective view of a preferred form of the carrier member for use in the mirror assembly of FIGS. 18 and 19;

FIG. 21 is an exploded, perspective view of a metal stamping for inclusion in the carrier member of FIG. 20 also illustrating a preferred form of switch adapted to mate with the electrical circuit;

FIG. 22 is a front elevation of a third embodiment of the modular rearview mirror assembly of the present invention with a portion of the prismatic mirror element removed;

FIG. 25 is a top plan view of a preferred form of the carrier member adapted for use with the mirror assembly of FIGS. 22–24;

FIG. 26 is an end elevation of the carrier member of FIG. 25;

FIG. 27 is a bottom plan view of the carrier member of FIGS. 25 and 26;

FIG. 28 is a perspective view of a stamped metal electrical circuit adapted for incorporation in the carrier member shown in FIGS. 25–27;

FIG. 29 is a rear elevation of the mirror assembly of FIGS. 22–24;

FIG. 30 is a sectional end elevation of a fourth embodiment of the modular review mirror;

FIG. 31 is an enlarged, fragmentary, sectional view of area XXXI of FIG. 31;

FIG. 43 is a sectional elevation of the mirror assembly taken along plane XLIII—XLIII of FIG. 32;

FIG. 44 is a sectional elevation of the mirror assembly taken along plane XLIV—XLIV of FIG. 32;

FIG. 45 is a sectional elevation of the mirror assembly taken along plane XLV—XLV of FIG. 32;

FIG. 46 is a sectional elevation of the mirror assembly taken along plane XLVI—XLVI of FIG. 32.

DESCRIPTION OF THE PREFERRED EMBODIMENTS

Figure 10:
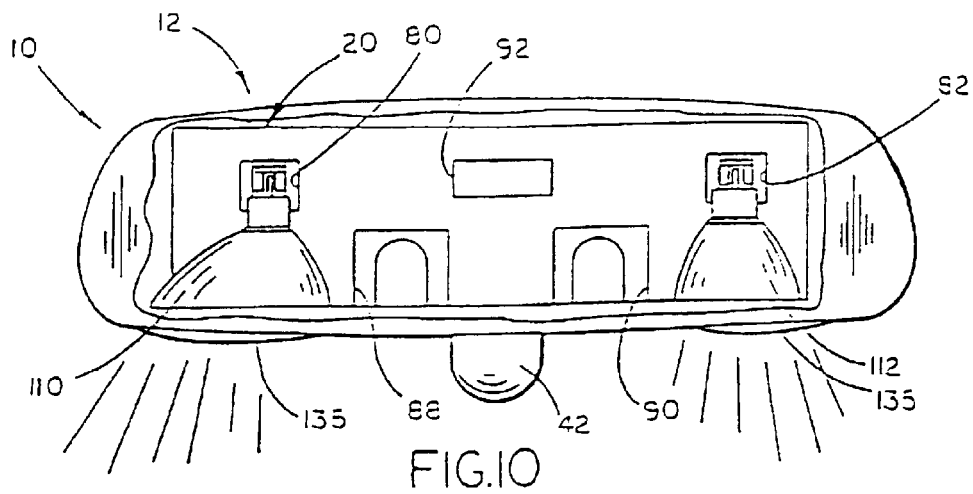
FIG. 10 is a rear elevation of the mirror assembly of FIGS. 1 and 2 broken away to show the carrier member assembly within the mirror housing/case and illustrating illumination from the lamp assemblies on the carrier member.
Figure 11:
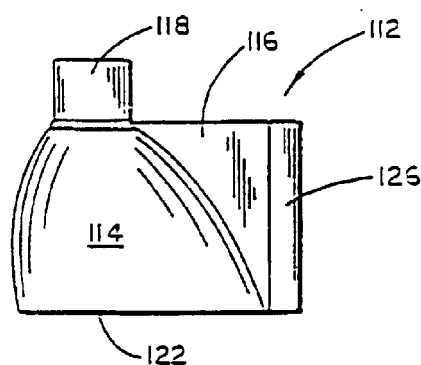
FIG. 11 is a side elevation of a reflector for use with the carrier member of FIG. 3.
Figure 12:
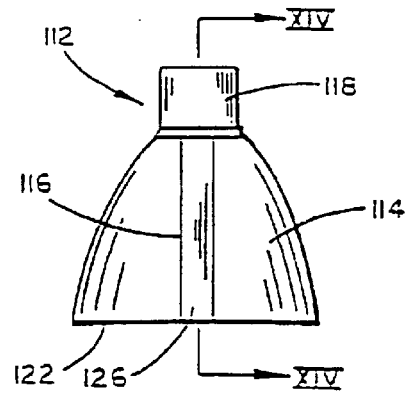
FIG. 12 is an end elevation of the reflector of FIG. 11.
Figure 13:
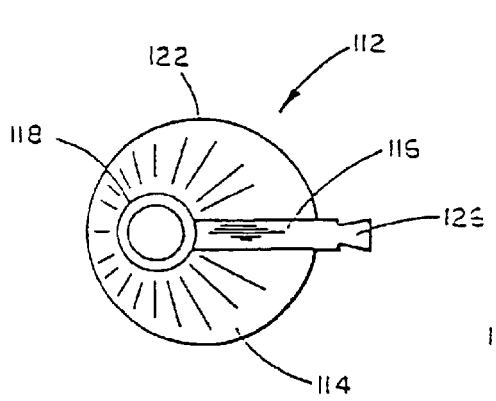
FIG. 13 is a top plan view of the reflector of FIGS. 11 and 12.
Figure 14:
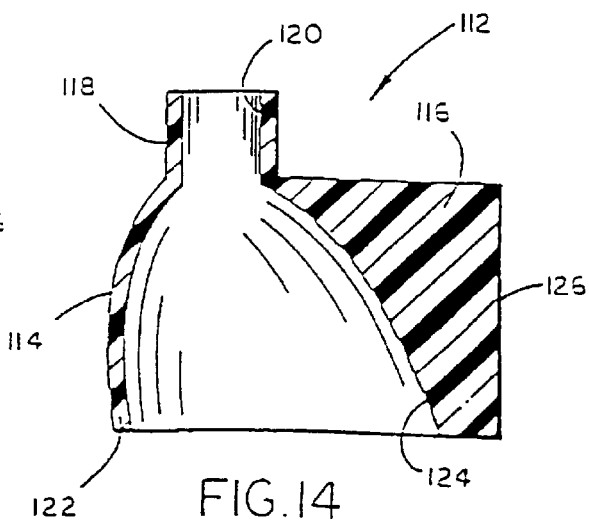
FIG. 14 is a sectional side view of the reflector taken along plane XIV—XIV of FIG. 12.

Referring to the drawing figures in greater detail, the terms "top," "bottom," "front," "back," "rear," "forward," "horizontal" and "vertical" are used for reference purposes only and are not intended to limit the scope of protection for the invention.

FIGS. 1–17 illustrate a first embodiment 10 of the modular rearview mirror assembly of the present invention including a molded, resinous plastic mirror housing having a case 12 and a mirror element retaining bezel 18, a reflective mirror element 14, a resinous, polymeric, shatterproofing layer 16 applied to the rear surface of the reflective element 14, and a modular carrier member or integrated subassembly module 20 which, as is more fully explained below, is mounted within the hollow interior of molded case 12 prior to fitting of the reflective mirror element 14. Carrier member 20 provides an integral support, electrical connections, and an electrical distribution network for one or more electrical components used within mirror assembly 10 such as a lamp or light bulb 130, electrical switches 72 for controlling the lamp or light bulb, a plug connection 92 for connecting the carrier member or subassembly to an external power source, or a receptacle for a printed circuit board which could be used for control and operation of instrumentation, information readouts or other electronic devices within the vehicle. Carrier member 20 also receives and mounts reflectors 110, 112 adapted to direct light from lamps or bulbs 130 through one or more openings 136, which openings are preferably closed and covered by lenses 135. Mirror assembly 10 also preferably includes a day/night toggle actuator assembly 22 connected to a pivotally adjustable support arm 24 and a mounting bracket 26 adapted to be received on windshield mounted button B on windshield W (FIG. 2), or on a header mount at the upper edge of the windshield in conventionally known fashion. Once carrier member 20 is mounted within mirror case 12 after insertion of actuator assembly 22, reflective mirror element 14 is assembled within the mirror case and retained in position by front mounted retaining bezel 18 having flanges or projections 19 spaced therearound for engaging the inner surface of the periphery of mirror case 12 (FIG. 1). Projections 19 are preferably received and ultrasonically welded in mounting brackets 21 spaced around the interior of the peripheral wall 30 of case 12. Bezel 18 alternately may be adapted for snap-fitting into place via projections 19.

Preferably, mirror case 12 is molded in one piece and includes a back or rear wall 28 and a continuous peripheral, side wall 30 defining a peripheral edge 32 and a front opening 34. A pair of spaced, generally vertical internal walls 36 extend between the top and bottom portions of the peripheral side wall 30 within the hollow interior of case 12 to define a space therebetween for receiving day/night toggle actuator assembly 22. An opening 38 between the top side wall portion and back 28 of case 12 allows insertion of mirror support arm 24 and mounting bracket 26 therethrough when actuator assembly 22 is mounted. Preferably, mirror case 12 and retaining bezel 18 are injected molded from non-electrically conductive, resinous ABS plastic, such as that sold under the trademark TERLURAN KR2889, by BASF Company of Wyandotte, Mich. Alternately, other resinous, melt processible plastics or moldable materials such as glass filled nylon and polypropylene could be used to form case 12. A suitable nylon is 13% glass modified nylon 6:6 sold as ZYTEL 71G13L by I.E. DuPont de Nemours & Company of Wilmington, Del., or PA123G13BK-47 by Bay Resins Inc. of Millington, Md. A suitable polypropylene is TENITE P6M4Z-007 by Eastman Chemical Products, Inc., Kingsport, Tenn.

Preferably, reflective mirror element 14 is formed from soda lime glass and has nonparallel front and rear surfaces, the rear surface preferably being coated with a highly reflective silver/chromium metal layer or other reflective surface. Alternately, clear plastic material such as polycarbonate or acrylic may be used to form prismatic mirror element 14. Scatterproofing/shatterproofing layer 16 is preferably formed from R101, a styrene butadiene rubber (SBR) polymer sold by Helmitin GmbH of Pirmasens, Germany, and is adhered to the rear surface to prevent scattering of glass fragments and shards in the event of glass breakage during an accident or the like. Alternately, an adhesive tape could also be used for layer 16.

Actuator assembly 22 is preferably of the type described in commonly-assigned U.S. Pat. No. 5,327,288 to Wellington et al. entitled "Reduced Vibration Day/Night Rearview Mirror Assembly," the disclosure of which is hereby incorporated by reference herein. As shown in FIGS. 1 and 2, actuator assembly 22 includes a toggle member 40 and a pivot lever 42, each preferably molded of a thermoplastic material such as 13% glass filled nylon. Toggle 40 includes a pivot journal 44 formed along its top edge, which journal corresponds to pivot axle 39 adjacent opening 38 at the upper rear of mirror case 12. Generally trapezoidal toggle 40 is preferably molded with a pattern of multiple voids defined by interconnecting, interior structural webs with a zinc die cast mounting ball 46 molded into and projecting outwardly from the back of toggle 40 in aperture 48 (FIG. 1). A generally rectangular aperture 50 extends through the entirety of toggle 40 adjacent its upper edge for receipt of an external power source connector plug 51, as described more fully hereinafter. A pivot tab or flange 52 extends downwardly from actuator 40 and engages the upwardly facing channel 54 on pivot lever 42 which is pivotally mounted between walls 36 within case 12 under actuator 40. Preferably, a spring bar is molded into the lower area of toggle 40 as is disclosed in U.S. Pat. No. 5,327,288. Thus, by pivoting lever 42 forwardly or rearwardly, mirror case 12 and thus reflective mirror element 14, carrier member 20 and bezel 18 are pivoted about axle 39 in journal 44 to change the position of mirror element 14 between a highly reflective day position in which light rays are reflected from the reflective rear surface of element 14 to the viewer, and a reduced reflectivity night position in which light rays from behind the vehicle are reflected from the front surface of mirror element 14.

The support arm 24 and mounting bracket 26 can be of any known variety including two ball pivot support arms, breakaway mounts adapted for mounting on the windshield button B as disclosed in commonly-assigned U.S. Pat. No. 5,327,288 to Wellington et al., or header mounted support arms as disclosed in commonly-assigned, U.S. Pat. No. 5,615,857, to Richard R. Hook entitled "Mirror Support Bracket," the disclosures of which are hereby incorporated by reference herein. Alternately, toggle actuators other than assembly 22 could be substituted in mirror assembly 10 within the concept of the present invention.

As is best shown in FIGS. 1 and 3–10, the integrated subassembly module or carrier member 20 preferably is a molded, thermoplastic, resinous support body 60 having a generally rectangular shape with its length greater than its height and a thickness preferably within the range of 0.08 to 0.25 inches, and more preferably of 0.08 to 0.15 inches. A stamped, metallic wire or other separately formed circuit member 62 (FIG. 4) is preferably insert molded within the carrier member support body 60 such that the circuit member is at least partially encased and/or encapsulated therein with selected electrical contacts projecting from the support body.

As is best seen in FIG. 4, the preferred form of the preformed circuit member 62 is stamped from metal such as brass or UNS-C26000 ¾ hard brass having a thickness of about 0.025 inches to include a series of bus strips 64 which extend and distribute electricity to bulb holders 66 and electrical switches 68 from external electrical connections 70. Alternately, rigid or flexible metallic wire could also be used. Thus, bus member 64a extends from electrical plug connection 70a to switch contacts 68b, 68c forming one side of the electrical connection for each of two separate switches 72a, 72b. A separate bus strip 64b extends from electrical connection 70b to bulb holder 66a and 66d which form one side of each of two sets of clip-type, bulb holders or receptacles 66. A third bus strip 64c extends between bulb holder 66b and connection 68a for switch 72a, while a fourth bus strip 64d extends from bulb holder 66c to electrical connection 68d for another electrical switch 72b. Electricity from plug connections 70a, 70b is directed through switches 72a, 72b selectively to bulb holder sets 66a, 66b or 66c, 66d holding separate lamps or light bulbs 130. In a preferred form, circuit member 62 is formed with integral punch out or knock out plugs 74a, b, c and d which are removed following insert molding of the circuit member within support body 60 to form electrically isolated bus strips as described below.

As is best seen in FIGS. 1, 3 and 5, support body 60 is preferably molded to include spaced, square or rectangular apertures 80, 82 through which extend bus strips 64b, 64c and 64d generally at a right angle to the rear surface of support body 60. Bulb holders 66a, 66b and 66c, 66d are thus spaced outwardly from the rear surface of the support body on those bus strips and open downwardly for receipt of suitable wedge-base light bulbs 130 which may optionally be gas filled for longer life and preferably have a luminous intensity less than or equal to four (4) candlepower, and more preferably less than or equal to three (3) candlepower. Centered beneath each aperture 80, 82 is an elongated, vertically extending slot 84, 86, respectively, adapted to receive and mount reflectors 110, 112 therein as described below. Spaced inwardly from each slot 84, 86 is a rectangular recess or pocket 88, 90, respectively, adapted to slidingly receive switches 72b, 72a, respectively, from the bottom opening thereof. Each recess 88, 90 includes a forwardly projecting wall 89, 91 on the front side of support body 60, which walls each include a slot contoured to receive the projecting plunger from switch 72a, 72b. A rectangular plug receptacle 92 is molded at the top center of support body 60 for receipt of an external power source connector plug 51 (FIGS. 1 and 2) through opening 50 of toggle member 40 in actuator assembly 22 as described above.

Preferably, carrier member 20 is an insert molded assembly with circuit member 62 preformed and inserted within a suitable mold cavity and support body 60 molded therearound to partially encase and/or encapsulate the circuit member within the support body such that the various electrical connections, plugs and bulb holders project from the support body. The preferred material for the support body of carrier member 20 is a melt processible, thermoplastic material such as nylon preferably a glass and/or mineral filled nylon such as 30% glass filled nylon, or PBT 33% glass filled nylon such as CELANEX 3300 available from Hoechst Celanese Company of Somerville, N.J., while the preferred process is injection molding. Alternately, compression molding, extrusion molding, reaction injection urethane molding or casting of the support body about the circuit member 62 can be used. Thus, carrier member 20 is preferably integrally molded to include an electrical current carrying conductor 62 capable of carrying electricity of greater than one (1) amp such that the electricity is conducted and distributed from a connection to an external electrical source to the various electrical components on member 20 such as lamps, switches, controls, instruments, or the like. It is also possible to premold the support body in two halves such that the halves include a cavity therebetween and place the circuit member 62 between the two halves and secure them together such as by snap-fitting, ultrasonic welding or the like. As another alternative, the molded support body can be preformed to include channels or receptacles for the circuit member 62 with the preformed circuit member being secured to at least one surface of the support body such as in snap-in fashion. In such case, just as in the above molding method, at least a portion of the circuit member would be held by portions of the support body and project therefrom. The molding of carrier member 20 can also incorporate a receptacle for connection or plugging in of a PC circuit board for various alternative functions within the vehicle after mounting of the mirror assembly, as is explained below in connection with assembly 270.

After molding or other formation of carrier member 20, punch out or knock out areas 94, 96, 98 and 100 (FIGS. 1, 3 and 5) are pierced or moved out of the support body and circuit member to delete the punch outs or knock outs 74a, 74b, 74c and 74d thereby completely separating and electrically insulating the bus strips 64a, 64b, 64c and 64d from one another. This prevents electrical shorting within the circuit member. The resinous, thermoplastic material preferably used for the support body 60 is also non-electrically conductive and forms an insulating barrier between the bus strips to prevent electrical shorting.

Referring now to FIGS. 1, 5 and 7–14, reflectors 110, 112 are adapted for removable mounting on circuit member 20. Preferably, reflectors 110, 112 are molded from a high temperature resistant (i.e., greater than 100° C. preferred), thermoplastic, melt processible resinous plastic material, preferably polycarbonate, although acrylic may also be used.

Each reflector is substantially similar although including a slightly different shape depending on the area of the vehicle intended to be illuminated. For reference purposes, reflector 112 is described as shown in FIGS. 11–14, although it should be understood that reflector 110 includes substantially the same elements. Reflector 112 includes a curved, hollow, bulbous reflector body 114 having an integral mounting flange 116 projecting to one side thereof and a bulb receiving tube 118 projecting upwardly and defining a bulb receiving aperture 120. The lower periphery 122 of the molded reflector lies in a plane and defines a generally circular profile for reflector 112 although other shapes/profiles may also be used such as a generally elliptical profile for reflector 110 as shown in FIG. 7. Reflector 110 is somewhat more elongated utilizing that generally elliptical profile to direct light both downwardly and to one side of the mirror assembly when mounted in a vehicle so as to properly illuminate the lap or seat area of the passenger side of the front seat of a vehicle, while reflector 112 directs light downwardly and toward the driver lap or seat area of the vehicle front seat as shown in FIG. 10. The inside surface 124 of the reflector body 114 is preferably vacuum metalized to provide a highly specular, shiny reflective surface efficiently directing light rays downwardly and in the intended direction from bulb 130 when received in aperture 120.

As is best seen in FIGS. 5, 7 and 11–13, the vertically extending edge 126 of mounting flange 116 is inwardly tapered to mate with a correspondingly tapered slot 84 or 86 (FIG. 7) when edge 126 is slidably inserted at the bottom of slot 84 or 86. The taper of the slot and molded edge forms a dovetail joint which prevents removal of the reflector from the carrier member in a direction perpendicular to the plane of the carrier member while maintaining flange 116 generally perpendicular to the plane of member 20. In addition, slots 84, 86 are generally aligned with bulb holders 66 at either end of carrier member 20 such that when wedge-base light bulbs 130 are inserted in the bulb holders, and project downwardly therefrom as shown in FIGS. 1, 5, 8 and 9, the sliding of the reflectors 110, 112 into slots 84, 86 causes light bulbs 130 to be telescopingly inserted in apertures 120 of tubes 118 such that the bulbs extend through these apertures and at least partially into the bulbous, hollow, reflector body 114 adjacent reflectorized surface 124. The bulb filament is, therefore, located within the hollow area defined by the reflectorized surface to properly direct light rays downwardly and toward the driver's seat area. The same is true of reflector 112 which directs light downwardly and toward the lap or seat area for the front seat passenger of the vehicle from the position of the rearview mirror assembly when secured to the center portion of the windshield above the instrument panel area.

As shown in FIGS. 1, 10 and 15–17, the final elements of mirror assembly 10 include lens elements 135 which are substantially similar to one another on either end of the assembly. Each lens element 135 is a slightly curved molded plastic body having the general shape of an ellipse, as is best seen in FIG. 15. Preferably, the lens elements are formed from an acrylic or polycarbonate material which is adapted to be scattering (such as by forming a stippled, scattering surface during molding of the lens element itself by providing a stippled surface in the mold cavity) to provide a diffused, translucent appearance. Thus, in assembly 10, neither lens is used as a focusing element, but rather provides diffused light to illuminate a wide area in the driver or passenger seat area. Alternately, lens 135 can be a diffuse optic, a clear optic, a holographic optic, a Fresnel optic, a binary optic, a sinusoidal optic, a diffractive optic or a tinted optic element as desired. Preferably, lens elements 135 are retained in elliptical lens openings 136 at either end of mirror case 12 (FIG. 1) by tapered, retaining prongs 138, one prong at either end of each lens element.

As will also be understood, reflectors 110, 112 can also be manufactured for adjustment once mounted on the carrier member 20. Mounting flange 116 could thus be pivotally or swivelly mounted to reflector body 114 so as to allow adjustment of the position of the reflector and thus the direction of the light emanating from the bulb 130 inside each reflector when adjusted. As shown in the embodiment of mirror assembly 10, however, reflectors 110, 112 are positioned in specific, fixed positions on the carrier member at specific angles to direct light in a specific direction for a predetermined vehicle. Alternately, other lenses which are clear and have light focusing or directing surfaces thereon could be used to further direct the light emanating from the reflector housings through case openings 136 so that predetermined areas of the vehicle can be illuminated.

As will now be understood, assembly of the modular rearview mirror assembly 10 will be apparent. A preassembled toggle actuator assembly 12 is inserted within the previously molded mirror case 12 by inserting bracket 26 through opening 38 from the interior of the case toward the rear of the case. Toggle actuator 40 is then slid into position such that pivot axle 39 engages journal 44. Pivot tab 52 is engaged with channel 54 of pivot lever 42 during insertion of toggle actuator 40 such that it is properly retained in position. Next, carrier member 20 is preassembled with the light bulbs 130, reflectors 110, 112, electrical switches 72 or other electrical components thereon. More specifically, electrical switches 72a, 72b are slid into recesses 88, 90 such that electrical connections 68a, 68b and 68c, 68d are plugged into corresponding receptacles in the switches as shown in FIG. 4. Next, wedge-base light bulbs 130 are inserted in bulb holders 66a, 66b and 66c, 66d. Thereafter, reflectors 110, 112 are each slid over bulbs 130 by engaging tapered flange 126 with slot 84 or 86 and moving the reflector upwardly into position over the bulb as shown in FIG. 8.

Following preparation of the modular integrated subassembly of carrier member 20, that subassembly is inserted by placing the carrier assembly into the interior of mirror case 12 with plug receptacle 92 extending into and/or aligned with aperture 50 of toggle actuator 40. The carrier member is received with the bottom periphery 122 of each reflector housing immediately adjacent the periphery of opening 136 such that periphery 122 is abutted against the inside surface of the peripheral side wall of the mirror case adjacent the opening 136. This is accomplished by dropping the lower edge of the carrier member 20 into the space between retaining rib 140 spaced outwardly of the front edge surfaces of walls 36 on the interior bottom portion of case wall 30 (FIGS. 1 and 2), followed by rotating the top edge in toward the actuator 40 until it is properly positioned with the reflectors and light bulbs in alignment with openings 136, and abutted against the exposed edge surfaces of walls 36. In this position, ribs 142a, 142b on the rear surface of carrier member 20 engage the outside surfaces of walls 36 to restrain lateral movement of carrier member 20 within the case.

Subsequently, reflective mirror element 14 is similarly placed in the interior of case 12 within the perimeter of peripheral side wall 30 followed by inserting and securing retaining bezel 18 either by snap-fit clips 19 or ultrasonic welding. As shown in FIG. 2, the rear of polymeric layer 16 resiliently engages the upper front surface of carrier member 20 to hold the carrier member and prevent vibration thereof. Once rearview mirror assembly 10 is mounted in the vehicle as shown in FIG. 2, a plug connector 51 from the vehicle power source can be inserted through opening 50 in actuator 40 and engaged with the electrical connectors 70a, 70b in plug connection 92 at the rear of the carrier member to provide external power to the carrier member and electrical components such as light bulbs 130 thereon. When assembled in this fashion, the plungers of switches 72a, 72b extend through the lower portion of bezel 118 and specifically apertures 21a, 21b through which push buttons 73a, 73b extend for operation of the switches and thus the light bulbs electrically connected thereto.

When installed in this manner in a rearview mirror case or housing, carrier member 20 provides a support, positioning element and electrical distribution network for electrical components such as light bulbs 130 and electrical switches 32. However, the carrier member also provides a strengthening member serving as a reinforcement or buffer between toggle assembly 22 and reflective mirror element 14 to retain the toggle assembly in place in the event of impact due to inflation of supplemental occupant restraint systems, also known as airbags, within vehicles as is explained in co-pending, commonly-assigned U.S. patent application Ser. No. 08/273,491, filed Jul. 11, 1994, by Harold W. DeYoung et al., now U.S. Pat. No. 5,521,760, the disclosure of which is hereby incorporated by reference herein.

Figure 18:
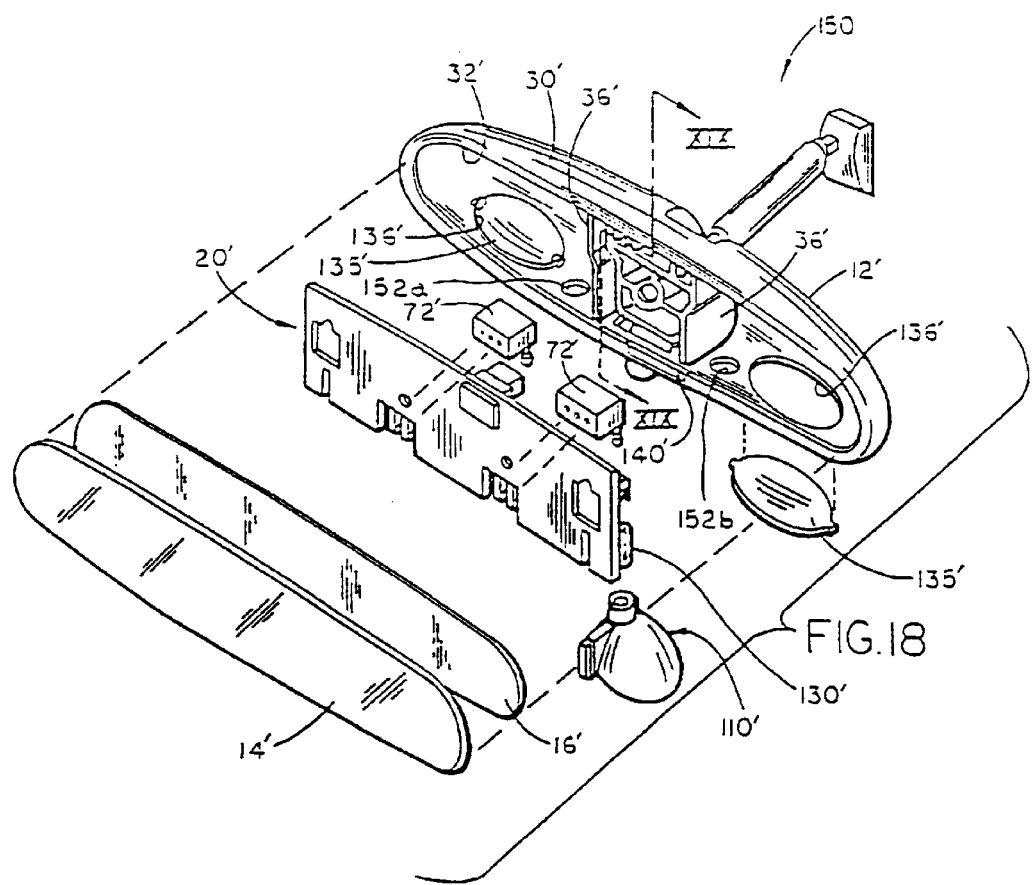
FIG. 18 is an exploded, perspective view of a second embodiment of the modular rearview assembly of the present invention.
Figure 19:
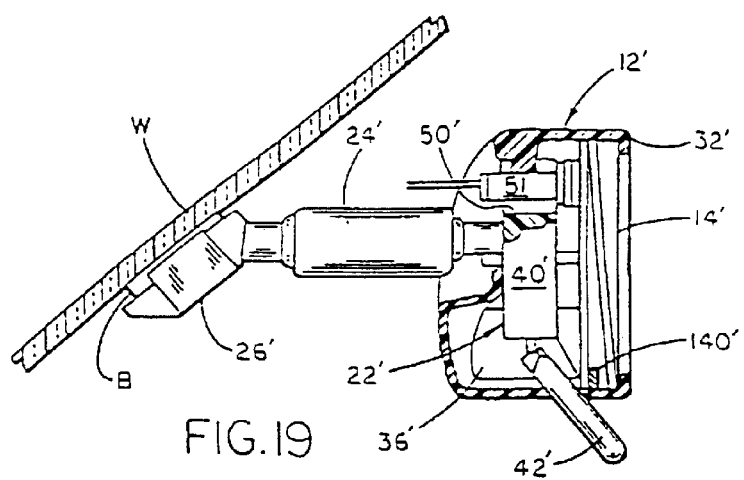
FIG. 19 is a sectional side elevation of the rearview mirror assembly of FIG. 18 taken along line XIX—XIX of FIG. 18.

With reference to FIGS. 18–21, a second embodiment 150 of the modular rearview mirror assembly for vehicles of the present invention is shown. Mirror assembly 150 incorporates a modified mirror case or housing 12' which is substantially similar to mirror case 12 except for being preferably molded from polypropylene, or alternately from polypropylene/polyethylene copolymer, and having the peripheral edge 32' of peripheral side wall 30' formed with lip 32'. Instead of using a two-piece mirror case including a retaining bezel as in embodiment 10, mirror case 12' incorporates a molded lip on peripheral edge 32' (FIG. 19) which allows snap-in insertion of reflective mirror element 14' immediately following molding of case 12' and when peripheral side wall 30' is still warm and relatively flexible. Specifically, prismatic mirror element 14' has a periphery which is slightly larger than the front opening to the mirror case defined by lip 32' as shown in FIG. 19. While mirror case 12' is still warm and relatively flexible, mirror element 14' can be snapped past the lip 32' into the position shown in FIG. 19 such that when mirror case 12' completes its cooling, the mirror case shrinks around the periphery of mirror element 14' to secure it in position and prevent rattling and vibration during use. In addition, mirror case 12' includes switch access openings 152a, 152b on either side of the toggle actuator assembly adapted to register with switches on the carrier member 20' when assembled within case 12'.

The preferred polypropylene material of one-piece case 12' has a lower heat deflection temperature, lower material cost, and higher material shrinkage rate than the preferred ABS or glass-modified nylon materials used for two-piece housing 12 described above. In spite of its lower heat deflection temperature, degradation of the one-piece polypropylene case from heat generated by the lamps in the assembly is obviated due to the efficiency of the highly reflective reflectors 110', 112' and overall efficient heat management within the assembly. As an aid to heat dissipation from the assembly, air ventilation passageways extending through case 12' and past and around the lamps and reflectors in the assembly can optionally be used as disclosed in commonly-assigned U.S. Pat. No. 5,178,448, the disclosure of which is hereby incorporated by reference herein.

For example, the heat deflection temperatures, determined under ASTM Standard D 648-88, of the preferred materials for cases 12 and 12' are:

|  | @ 264 psi | @ 66 psi |
|---|---|---|
| ZYTEL 71G13L Glass-Modified Nylon | 446° F. | 491° F. |
| TERLURAN KR2889 ABS | 223° F. | 234° F. |
| TENITE P6M4Z-007 Polypropylene | 125° F. | 181° F. |

Likewise, the mold shrinkage rate for the preferred materials for cases 12 and 12' are:

| | |
|---|---|
| ZYTEL 71G13L Glass-Modified Nylon | .008–.014 inch/inch |
| ABS Polymer | .003–.004 inch/inch |
| TENITE P6M4Z-007 Polypropylene | .010–.025 inch/inch |

Thus, it is preferred that the material shrinkage rate for the material of one-piece case 12' be greater than 0.010 inch/inch.

In addition to the above modified mirror case 12', mirror assembly 150 includes a modified circuit member 62' (FIG. 21) which is preferably insert molded in a support body 60' to form carrier member 20' in the same manner as described above for assembly 10. Like circuit member 62, circuit member 62' is preferably stamped from sheet metal such as brass or formed from metallic wire to include a plurality of bus strips providing electrical connections within the carrier member. Each of the bus strips is substantially similar to those in circuit member 62 except that the lower ends of bus strips 64a', 64c' and 64d' are modified such that tapered prongs or electrical connectors 68a', 68b', and 68c', 68d', extend at right angles to the remainder of the bus strip and in the same direction in which the bulb holders 66 and electrical connections 70 extend. As shown in FIG. 20, when circuit member 62' is insert molded or otherwise encapsulated at least partially within support body 60' of carrier member 20', prongs 68a', 68b' and 68c', 68d' extend into recesses 88', 90' such that electrical switches 72' can be inserted into those recesses and plugged into the electrical connections in a direction substantially perpendicular to the plane of carrier member 20'. This is different from the insertion of switches 72a, 72b which are inserted in a direction substantially parallel to the plane of carrier member 20 from the bottom of recesses 88, 90 as shown in FIGS. 3 and 4.

Accordingly, with reference to FIGS. 18 and 19, once carrier member 20' forming an integrated subassembly module is assembled with appropriate reflectors, light bulbs and switches in the aforementioned manner, such that the plungers of switches of 72' extend downwardly with switch buttons 73' mounted thereon, carrier member 20' may be inserted within mirror case 12' by placing the lower edge within the case between rib 140' and the front surfaces of walls 36' and rotating the top edge toward the toggle actuator assembly such that switch plungers pass through switch openings 152a, 152b. Carrier member 20' then abuts against the front edges of walls 36'. All of this occurs within a relatively few seconds after the case 12' has been removed from the mold where it is formed. During this time period, the preferred polypropylene or polypropylene/polyethylene copolymer material of case 12' is still warm and is preferably at a temperature of approximately 120° F. to 210° F., and more preferably 135° F. to 165° F. It takes but a few seconds to insert carrier member 20' in the above manner after which the prismatic reflective mirror element 14' may be mounted by snapping it past retaining lip 32' which is still in its warm and relatively flexible state as described above. The rear of polymeric layer 16' engages the top, front surface of carrier member 20' to hold it against the front edges of walls 36' and prevent rattling and/or vibration of the carrier member within case 12'. Thereafter, assembly 150 is allowed to cool such that the case 12' further shrinks tightly about the peripheral edge of carrier member 20' and reflective mirror element 14' to help hold them securely in place against vibration and rattling. Subsequently, lens elements 135' may be inserted in lens openings 136' to complete the assembly. An electrical connector is inserted to engage connections 70a', 70b' through aperture 50' of actuator 40' once the mirror is mounted in the manner described above.

Figure 23:
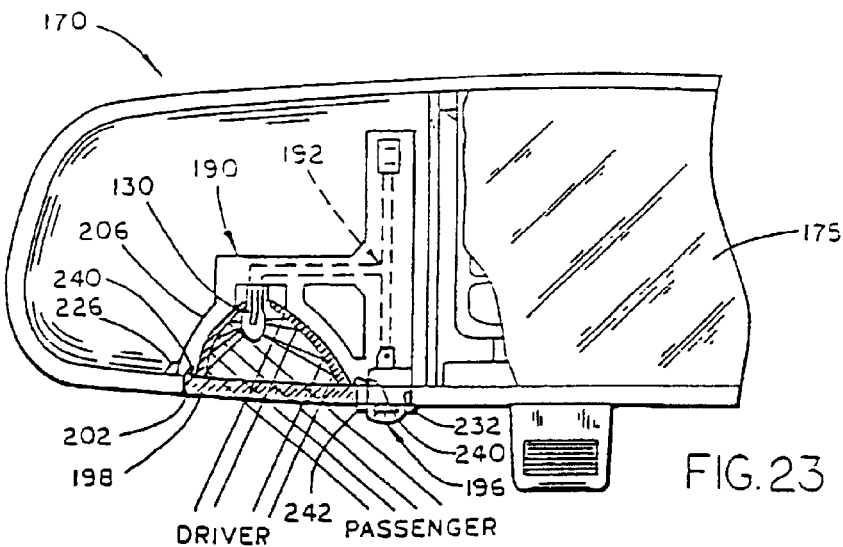
FIG. 23 is a fragmentary, front elevation, shown partially in section, of the mirror assembly of FIG. 22.

With reference to FIGS. 22–29, a third embodiment 170 of the modular rearview mirror assembly of the present invention is illustrated. Mirror assembly 170 includes a hollow molded mirror case 172 preferably formed from polypropylene and including a formed lip 174 similar to that used in connection with mirror assembly 150 allowing snap-in insertion of a reflective prismatic mirror element 175 having a shatterproofing layer thereon (FIG. 23). Also included is a toggle actuator assembly 176 connected to a support arm and mirror bracket similar to that used in embodiments 10 and 150 except that toggle actuator assembly 176 is formed in one piece with pivot lever 178 joined by a living hinge 180 to a spring bar 182. In addition, toggle actuator 184 is pivotally mounted on axles 186 near the top of the rearview mirror assembly between vertical walls 177. In addition, there is no through aperture in the actuator assembly for receipt of an external power connection since the carrier member 190 used in assembly 170 includes its own receptacle for such a power connection.

Instead of a rectangular carrier member on which are mounted spaced lamps and reflectors for illumination from either end of the mirror assembly as in embodiments 10 and 150, and which is assembled prior to insertion of the reflective mirror element to close the mirror case, mirror assembly 170 includes a removable carrier member 190 which at least partially encapsulates a circuit member 192 (FIG. 28), a lamp or bulb 130, a stamped metallic reflector 194, a switch assembly 196, a lens element 198 and a plug receptacle 200 for receiving an external power connector. Carrier member 190 with these elements can be inserted and removed from mirror case 172 after mounting and assembly of mirror element 175 behind snap-in lip 174 to provide for servicing and repair of the lamp or light unit in the carrier member or for access to the interior of the mirror case for any other reason. As shown in FIG. 22, when mounted in the mirror assembly, the toggle operator 197 of switch 196 protrudes slightly below the peripheral side wall at the bottom of the mirror case for access and operation.

As is best seen in FIGS. 23–27, carrier member 190 includes a generally rigid body or support 201 preferably formed from polypropylene and having a generally trapezoidal shape when viewed from the top or bottom conforming to the shape of an opening 202 in the bottom wall of mirror case 172 (FIG. 23). Rigid body 201 includes an upstanding wall 204 on its top surface in which is molded and at least partially encapsulated circuit member 192 (FIG. 28) such that various electrical connections extend therefrom.

Formed integrally with wall 204 is a hollow, bulbous reflector mount or receptacle 206 from which a bulb mounting socket 208 extends upwardly and includes a through aperture 210 into which extend bulb holders or connectors 252a, 252b from circuit member 192. At the opposite end of rigid body 201 is a switch receptacle 212 molded integrally with wall 204 and including a through aperture 214 into which extend electrical connectors 256a, 256b from circuit member 192. On the rear side of wall 204 is molded integrally a plug connector 200 forming a rectangular receptacle for receiving an external power connector into which extend electrical connections 254a, 254b from circuit member 192. Integrally molded with plug connection 200 are resilient prongs or barbed fingers 216 adapted to engage the inside surface of an internal wall or rib 218 which outlines an aperture 220 through the rear wall 179 of mirror case 172. In addition, rigid body 201 also includes an upstanding peripheral wall 222 (FIGS. 24 and 25) extending around the edge of the body, an upstanding, substantially rigid L-shaped flange 224 at one end, and a pair of resilient prongs or retaining fingers 226 at the opposite end. The bottom surface 228 of rigid body 201 defines a pair of spaced openings 230, 232, and a recess area 234 surrounding opening 230. Recess 234 is matched to the configuration and outline of lens element 198 and includes two spaced pair of openings 236, 238 adapted to receive barbed securing fingers or prongs 240 on the upper surface of lens element 198. Lens element 198 may thus be removably inserted in recess 234 such that it is flush with surface 228 to cover opening 230 and close the chamber inside reflector 194 as will be more fully described below. Likewise, opening 232 receives switch assembly 196 therethrough from the bottom such that rim 242 on switch 196 engages bottom surface 228 of rigid body 201 adjacent opening 232 (FIG. 23). Toggle 244 for switch 196 is thus accessible from the bottom surface of the mirror and carrier member 190. Lens element 198 is preferably formed from an acrylic or polycarbonate, molded material and may be either clear or cloudy/translucent to provide focused light in which case various lens surfaces will be provided on the lens element or diffuse light for illumination of a general area within the vehicle.

Figure 24:
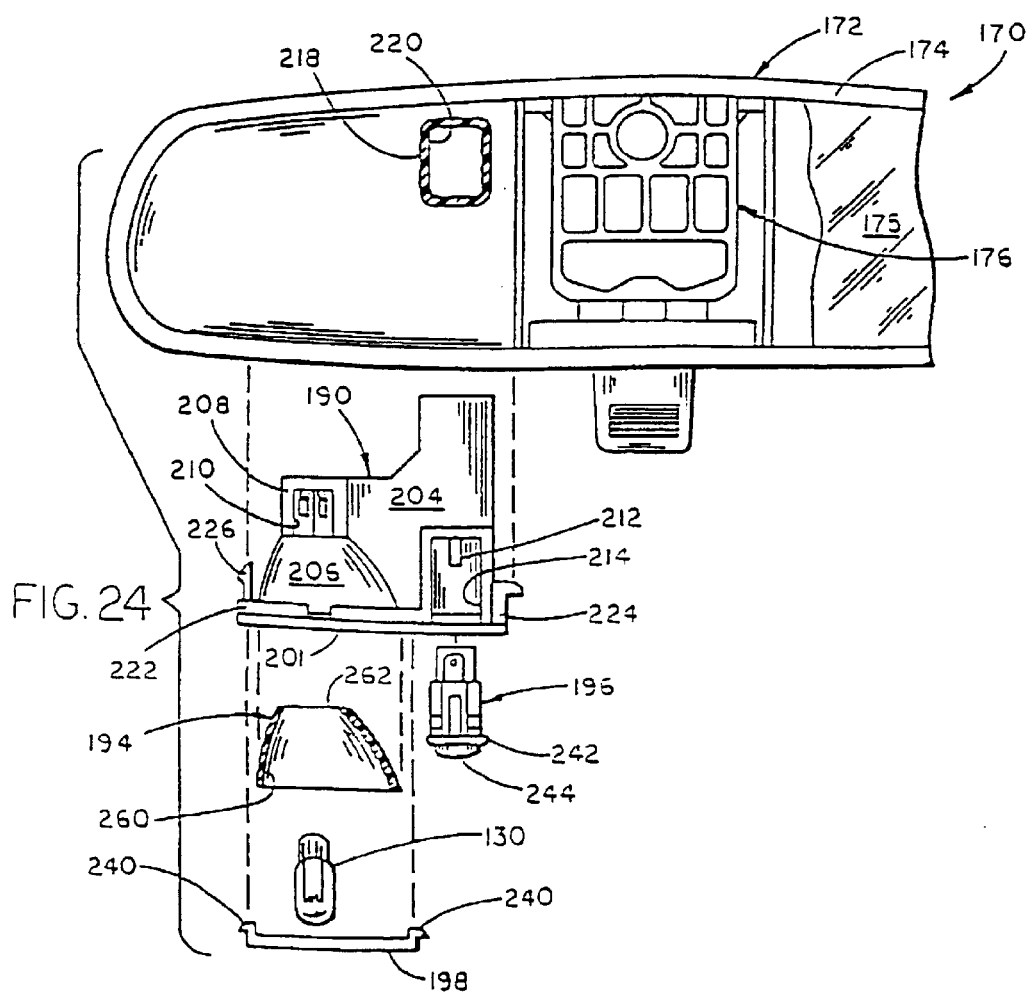
FIG. 24 is an exploded, front elevation of the mirror assembly of FIGS. 22 and 23.

As shown in FIG. 28, circuit member 192 is preferably stamped from thin brass or other suitable metal and includes three bus strips 250a, 250b, and 250c. Bus strip 250a extends from clip-type bulb holder 252a to plug connector 254a at its opposite end. Bus strip 250b extends from clip-type bulb holder 252b to switch engaging electrical connection 256a at its opposite end. Bus strip 250c extends from switch engaging electrical connection 256b at one end to plug connection 254b at its opposite end. Preferably, the brass circuit stamping is formed with punch out or knock out portions 258a and 258b between bus strips 250a and 250b and a separate brass stamping bus strip 250c. These members are placed in a suitable mold cavity and carrier member 190 is preferably injection molded therearound to form an integral molding which at least partially encapsulates the circuit member 192 therein such that bulb holders 252, and electrical connections 254, 256 extend therefrom in the indicated apertures for connection to the various electrical components. Of course, as explained above in connection with carrier member 20, other molding methods may be used such as compression molding, extrusion molding, reaction injection molding for urethane or casting. As is best seen in FIG. 24, reflector 194 is preferably stamped from aluminum, has the shape of a compound or double parabola, and is highly polished on its inside surface 260 for high and specular reflection of light from light bulb 130. Alternately, the reflector shape can be molded in wall 204 and have its inside surface vacuum metalized just as with reflectors 110, 112 to provide high, specular reflection. Reflector 194 also includes an upper opening 262 through which the light bulb 130 extends when mounted in bulb holders 252a, 252b, as shown in FIG. 23. The shape of the hollow body portion of reflector 194 is parabolic on each side of lamp 130. As shown in FIG. 23, the specific shape is that of a double or compound parabola designed to collect light and direct it both to the driver and front seat passenger lap areas. Reflector 194 is adapted to correspond to the internal surface of the reflector receptacle 206 molded integrally with carrier member 190 as described above.

Accordingly, assembly of mirror assembly 170 will now be apparent. Carrier member or integrated subassembly module 190 is first assembled by placing reflector 194 within receptacle 206 from the bottom surface 228 of body 201 of the carrier member. Thereafter, a wedge base light 130 is inserted through the bottom opening of the reflector 194 into the bulb holders 252a, 252b such that the bulb extends through reflector opening 262, as shown in FIG. 23. Thereafter, lens element 198 is inserted by engaging prongs or fingers 240 in apertures 236, 238. Finally, switch assembly 196 is inserted through opening 232 such that its electrical contacts engage contacts 256a, 256b of circuit member 192.

With the carrier member subassembly completed in the above manner, that assembly is inserted through bottom opening 202 in the mirror 172 such that wall 204 extends upwardly and plug receptacle 200 is aligned with opening 220 in the rear wall of mirror case 172. Prongs or fingers 216 are then engaged with the inside surface of rib or wall 218 on the rear inside of case 172 to engage the plug receptacle within opening 220 and prevent it from being pushed into the interior of the case when an external plug connector is engaged. Simultaneously, flange 224 is engaged over a wall adjacent opening 220 while resilient prongs 226 flex and engage the inner surface of the bottom wall of the mirror case 172 at the opposite end of the carrier member to complete assembly. Should removal be desired, a tool such as a screw driver can be inserted through slot 264 adjacent resilient fingers 226 to flex the fingers and allow pivotal removal of carrier member 190 from opening 202 after disengagement of the plug receptacle 200 and ribs 216 from the rib 218 toward the top of the case.

Referring now to FIGS. 30 and 31, a fourth embodiment 270 of a modular interior rearview mirror assembly incorporating the present invention is shown. Assembly 270 is of the type described in published European Patent Application No. 0 615 882 A2, filed Mar. 18, 1994, the disclosure of which is hereby incorporated by reference herein. The assembly includes a mirror case 272 which, like mirror cases 12, 12' and 172 above, is preferably molded from a resinous, thermoplastic or thermoset plastic which may be reinforced with fibers, adapted for mounting on a vehicle windshield by means of an adjustable mirror support. Instead of a ball member extending outwardly from its rear side, mirror case 272 includes a socket 274 for receiving a ball member extending outwardly from the mirror support, and has a rear wall 276, and a peripheral wall 278 having top, bottom and end portions. Socket 274 is formed in a recess 280 in the rear wall of the case, as shown in FIG. 30. The mirror case also includes a plurality of support flanges integrally formed on the interior surface of the mirror case 272 to support a variable reflectance, electro-optic mirror cell 282 more fully described below. A forward facing light sensor (not shown) extends through rear wall 280 while a second light sensor (not shown) faces rearwardly. Electro-optic, reflective mirror cell 282, which preferably is an electrochromic cell either of the solid-state type or the electrochemichromic type, is mounted in the rearwardly facing opening of mirror case 272 and held therein by a peripheral bezel 284 as shown in FIGS. 30 and 31. A layer of foam material 286 is adhered to the rear surface of mirror cell 282 and covers substantially the entire rear surface of the cell except where items such as through-the-cell photodetectors and information displays, such as compass displays, are mounted behind the mirror. Foam layer 286, such as a cross-linked polyethylene foam, acts as a resilient shock absorber to reduce the risk of breaking the mirror element during an impact, and includes an adhesive layer applied to both its front and rear surfaces. One adhesive surface of the foam is adhered to the rear surface of mirror cell 282. The second adhesive surface provides an attachment for a printed circuit board 288 mounted thereon. The rear surface of circuit board 288 which faces away from mirror cell 282 carries various electrical components of an electrical circuit used to control operation of the electro-optic mirror cell such as a circuit, for example, like that described in commonly-assigned U.S. Pat. No. 4,886,960, the disclosure of which is hereby incorporated by reference herein. Printed circuit board 288 also includes a two-position electrical switch (not shown) for on/off control of the electro-optic circuit.

Preferably, variable reflectance, electro-optic reflective mirror cell 282 is an electrochromic mirror cell that includes a transparent, front glass sheet 290 and a transparent, rear glass sheet 292 having a reflective coating 294 applied to its rear surface. Front glass 290 and reflective rear glass 292 are slightly offset relative to one another such that the upper and lower edges project for connection to appropriate metal connection strips (not shown). A variable light transmittance, electrochromic medium 296 is sandwiched in the space between the front glass 290 and rear glass 292. The front surface of rear glass 292 and rear surface of front glass 290 each have a transparent electroconductive coating, such as indium tin oxide or doped tin oxide or the like, to conduct electricity across the full contact extent of electrochromic medium 296 from the connection strips secured at the offset top and bottom of the front and rear glass sheets. When controlled by printed circuit 288, electrical voltage is applied across electro-optic cell 282 between front glass 290 and rear glass 292 causing a variation in the transmittance of layer 296 such as darkening or opacity to reduce the light reflected by the reflective rear glass 292. Electrochromic medium 296 may, for example, be an electrochemichromic medium such as is described in commonly-assigned U.S. Pat. Nos. 5,140,455 and 5,151,816 or a solid-state electrochromic medium such as described in the following publications: N. R. Lynam, "Electrochromic Automotive Day/Night Mirrors", *SAE Technical Paper Series,* 870636 (1987); N. R. Lynam, "Smart Windows for Automobiles", *SAE Technical Paper Series,* 900419 (1990); N. R. Lynam and A. Agrawal, "Automotive Applications of Chromogenic Materials", *Large Area Chromogenics: Materials and Devices for Transmittance Control,* C. M. Lampert and C. G. Granquist, EDS., Optical Engineering Press, Washington (1990), the disclosures of which are each hereby incorporated by reference herein.

Supported to the rear of circuit board 288 is an integrated subassembly module or carrier member 20" similar to that used in assembly 10 above. Carrier member 20" is also a molded, thermoplastic, resinous support body incorporating an integrally molded, preformed circuit member, pairs of bulb holders 66", a pair of lamps or light bulbs 130 and a pair of reflectors 110", 112", all of which are substantially similar to those on carrier member 20, formed and/or secured thereto as in carrier members 20, 20'. Reflectors 110" are positioned to direct light through opening 281 in the case bottom and lens 135". Carrier member 20" also preferably includes a pair of electrical switches 72" projecting through bezel 284 for access and operation from the front in a manner similar to switches 72 on carrier member 20 in assembly 10. Carrier member 20" further includes a plug receptacle 92" on its rear surface and aligned with an opening in case wall 280 for receiving a plug extending from the vehicle electrical system. Suitable electrical connections from carrier member 20" to circuit board 288 are also included.

Assembly of mirror assembly 270 is similar to that for assembly 10 above. After molding of case 272, previously prepared subassembly carrier member 20" is placed within the case interior. Next electro-optic mirror cell 282 with foam layer 286 and circuit board 288 are placed as a unit within case 272 while making suitable electrical connection between circuit board 288 and carrier member 20". Bezel 284 is secured by snap-fit clips or ultrasonic welding to retain the components within the case as in assembly 10 with the electrical switches from carrier member 20" extending through bezel 284 for access and operation of lamps 130 as in assembly 10. Lenses 135" are then fitted over openings 281. Thus, the carrier member subassembly of the present invention is useful with either manual day/night rearview mirrors, or rearview mirrors incorporating electrochromic or other electro-optic reflective elements.

As shown in FIGS. 32–46, a fifth embodiment 300 of the modular rearview mirror assembly of the present invention includes a molded, resinous, polymeric plastic mirror housing/case 302, a prismatic reflective mirror element 304, a resinous, polymeric, shatterproofing layer 306 applied to the rear surface of reflective element 304, a molded, resinous, polymeric plastic day/night toggle actuator 308 for moving the case assembly between day and night reflective positions, and a modular carrier member or integrated subassembly module 310. Day/night toggle actuator 308 and carrier member 310 are adapted to be fitted within the hollow interior of molded housing/case 302 prior to snap-in insertion of mirror element 304 therein. Carrier member 310 provides an integral support, electrical connections, and an electrical distribution network for one or more electrical components used within mirror assembly 302 such as lamp or light bulbs 130, electrical switches 408 for controlling the lamps or light bulbs, electrical contacts providing a plug connection for a plug connector 312 for connecting the carrier member to an external power source such as the electrical system of the vehicle in which mirror assembly 300 is adapted to be mounted, or a diode 452 adapted to be fitted to the circuit member 402 within carrier member 310 to reduce or prevent electrical current leakage and thus battery drain from the vehicle electrical system when connected via plug connector 312. As with the other mirror assembly embodiments mentioned above, carrier member 310 receives and mounts reflector housings or reflectors 314, 316 which are adapted to direct light from lamps or bulbs 130 through one or more openings 318 in the bottom wall of case 302, which openings are preferably closed and covered by lenses 380. Day/night toggle actuator 308 is preferably connected to a pivotally adjustable support arm and a mounting bracket of the type shown in FIG. 1 which are adapted to be received on a windshield mounted button B on windshield W of the type shown in FIG. 2, or on a header mount at the upper edge of the windshield in conventionally known fashion.

Figure 32:
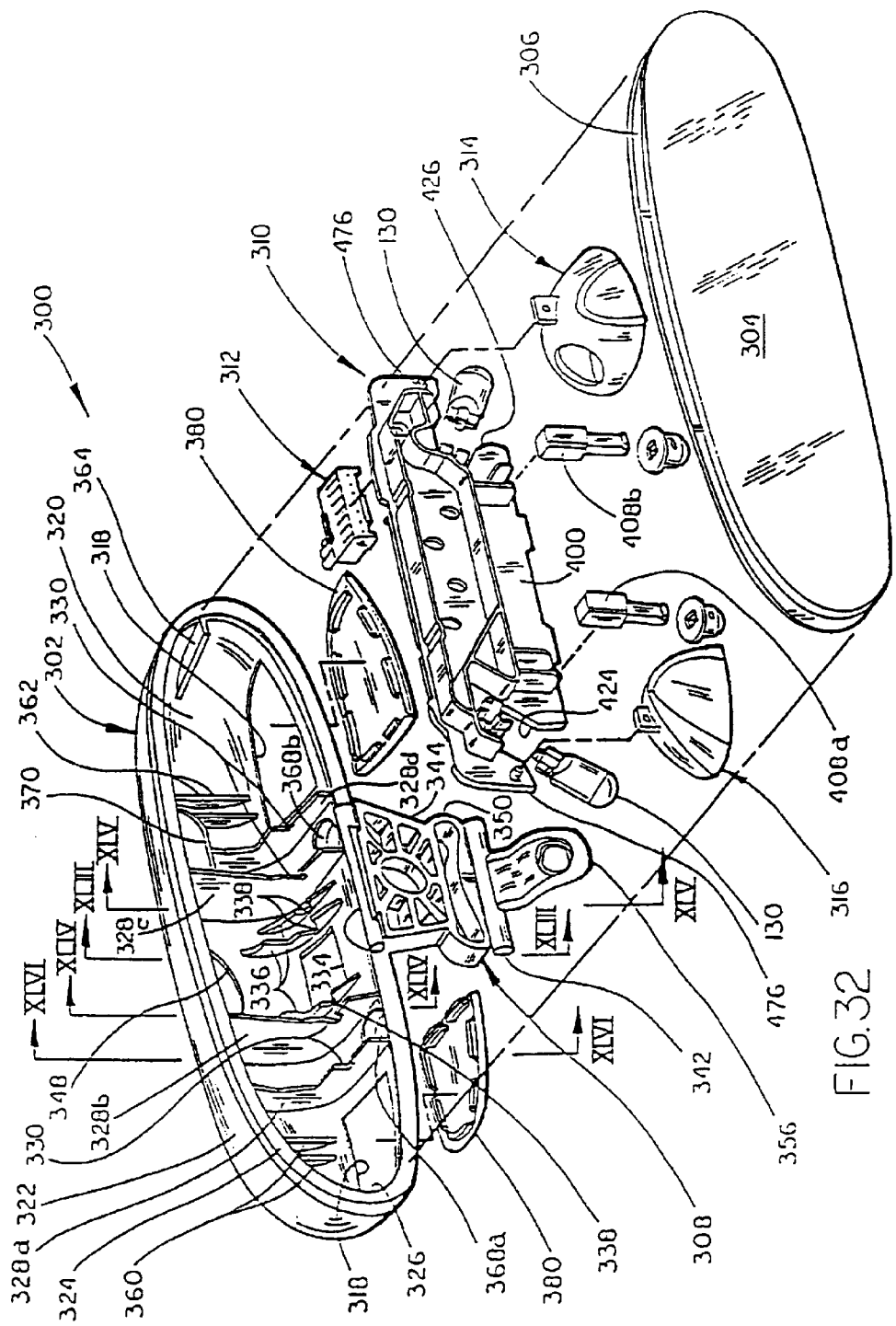
FIG. 32 is an exploded, perspective view of a fifth embodiment of the modular rearview mirror assembly for vehicles of the present invention.
Figure 33:
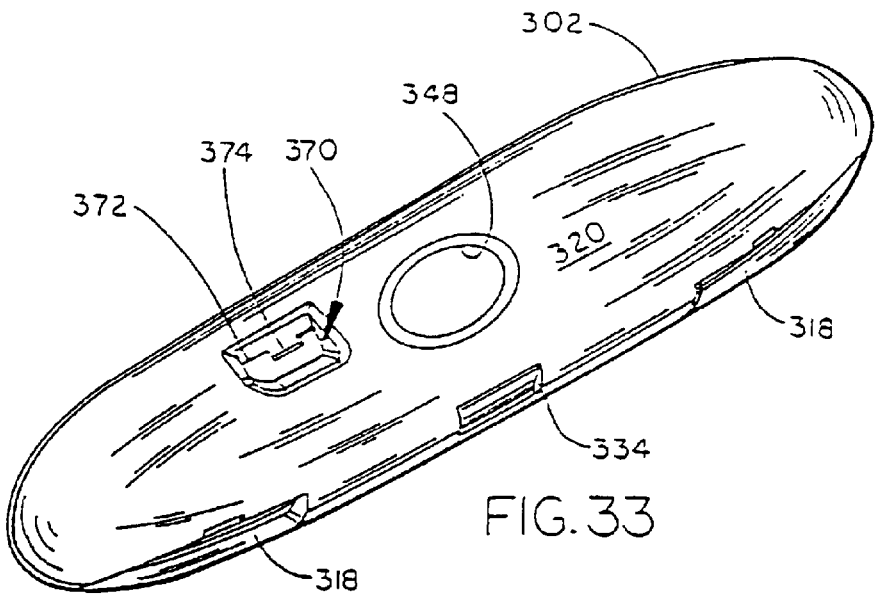
FIG. 33 is a rear perspective view of the mirror housing/case for the assembly of FIG. 32.
Figure 36:
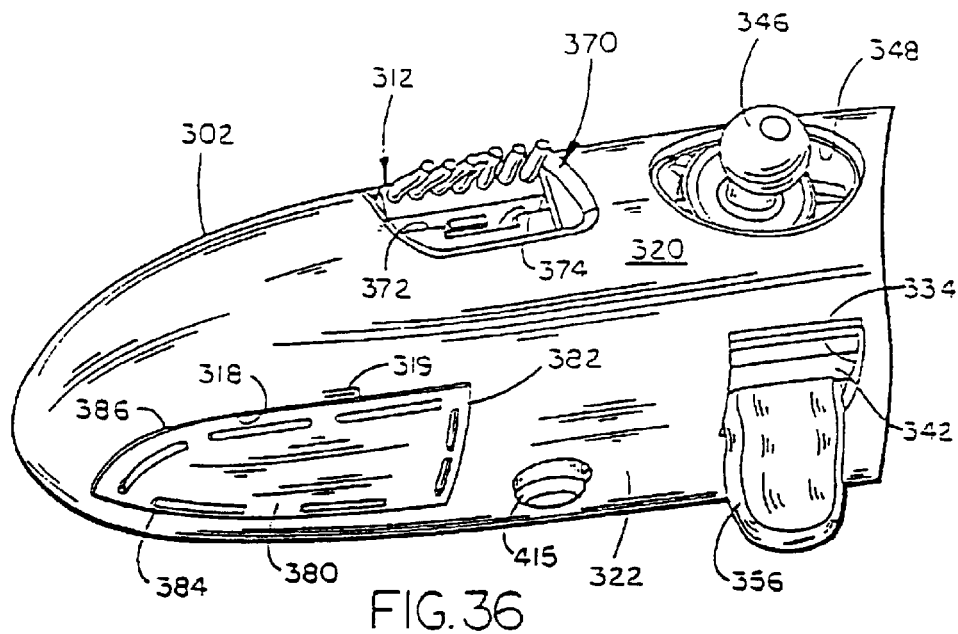
FIG. 36 is a fragmentary, perspective view of the rear and bottom of the mirror assembly of FIG. 32 illustrating the electrical plug connection from the vehicle electrical system inserted in the mirror assembly.

With reference to FIGS. 32, 33 and 36, mirror case 302 is preferably molded in one piece from polypropylene of the type sold under the trademark TENITE P6M4Z-007 from Eastman Chemical Products, Inc. of Kingsport, Tenn., and includes a back or rear wall 320, and a continuous, peripheral, side wall 322 which terminates in a peripheral lip 324 defining a front opening 326. Like embodiment 150 of the mirror assembly mentioned above, the molded lip 324 on mirror case 302 allows snap-in insertion of reflective mirror element 304 immediately following molding of case 302 when peripheral side wall 322 is still warm and relatively flexible. Prismatic reflective mirror element 304 has a periphery which is slightly larger than the front opening 326 defined by lip 324. While mirror case 302 is still warm and relatively flexible, mirror element 304 can be snapped past lip 324 into the position shown in FIGS. 43–46 such that when mirror case 302 completes its cooling, the mirror case shrinks around the periphery of the mirror element to secure it in position and prevent rattling and vibration during use.

As is best seen in FIGS. 32 and 43–46, mirror case 302 includes a series of internal ribs or walls within its hollow interior which extend between the top and bottom portions of the peripheral side wall 322 in generally vertical planes. Intermediate lens openings 318 are a series of four spaced walls 328a, 328b, 328c, and 328d which extend from a position adjacent the snap-in lip 324 rearwardly along the bottom side wall within the case to rear wall 320 vertically between the top and bottom side wall portions, and forwardly toward lip 324 along the top side wall. Each internal wall 328a, 328b, 328c, and 328d includes a pair of generally vertically aligned slots 330 having a width corresponding to the thickness of carrier member 310. Slots 330 are adapted to receive corresponding recesses formed in the top and bottom edges of carrier member 310 as will be more fully explained below. In addition, the upper portion of walls 328a, 328b, 328c, and 328d each include an inclined surface 332 (FIG. 46) adjacent the upper slot 330 which cooperates with an inclined camming surface in the corresponding recess on carrier member 310 to allow snap-in insertion of the carrier member during assembly. The rearmost edges 331 of slots 330 engage the rear surface of carrier member 310 for secure, non-vibratory support when the carrier member is properly mounted in the slots as shown in FIG. 46.

As shown on FIGS. 32, 33, 36, and 43, a toggle access aperture 334 is formed in case 302 and extends from the bottom portion of side wall 322 slightly into the rear wall 320. Toggle aperture 334 is generally centered between lens openings 318 along the center line of housing of 302. Spaced on either side of toggle aperture 334 and between walls 328b and 328c are a series of horizontally spaced, vertical wall segments 336a, 336b, 336c, and 336d (FIGS. 32 and 45) which include aligned, circular, bottom and top recesses or journals 338, 339 receiving the upper and lower cylindrical axles 340, 342 of toggle actuator 308 as shown in FIG. 45. Toggle actuator 308, in addition to axles 340, 342, includes a generally rigid body 344 from which a ball member 346 extends rearwardly through rear opening 348 in rear wall 320. Axle 342 is joined to body 344 by a compressible, U-shaped spring member 350 and a resilient web 352 (FIGS. 43, 44). Actuator mounting walls 336b and 336c which are immediately adjacent either side of toggle aperture 334 each include a generally vertically extending edge 354 which engages the rear most edge of spring member 350 when pivot lever 356 and axle 342 are rotated to their night position shown in solid in FIGS. 32 and 43. Likewise, the rear surface of carrier member 310 includes an inclined surface 440 which is engaged by the forward most edge of spring member 350 when pivot lever 356 is rotated on axle 342 to its day position as shown in phantom in FIG. 43. Area 440 thus forms a stop which engages the toggle actuator to limit its movement in the day position so as to position the prismatic reflective mirror element 304 for proper viewing. Two pair of reinforcing ribs or walls 360, 362 extend generally vertically on the inside surface of rear wall 320 and then forwardly along top side wall toward lip 324 generally above lens openings 318 for added strength in the mirror case. In addition, ribs 364 are provided at either end of case 302 on its inside end surfaces to provide stops for properly positioning the ends of mirror element 304 when snapped into the housing. Mirror case 302 also includes switch access openings 368a, 368b on either side of the toggle actuator assembly and intermediate walls 328a, 328b and 328c, 328d which openings are adapted to register with switches on the carrier member 310 when assembled within case 302.

As mentioned above in connection with embodiment 10, opening 348 in the rear wall of the mirror case allows insertion of a mirror support and mounting bracket, such as support arm 24 and bracket 26 of embodiment 10, therethrough when actuator 308 is mounted within the case by snapping the pivot axles 340, 342 into circular recesses 338, 339. The support arm and mounting bracket can be of any known variety as described above in connection with embodiment 10. Alternately, toggle actuators other than that shown at 308 could also be substituted in mirror assembly 300 within the concept of the present invention.

By pivoting lever 356 of toggle actuator 308 forwardly or rearwardly, mirror case 302 and thus its reflective mirror element 304, carrier member 310 and lenses 380 are pivoted about axle 340 in journals 339 to change the position of the mirror element 304 between a highly reflective day position in which light rays are reflected from the reflective rear surface of the element 304 to the viewer and a reduced reflectivity night position in which light rays from behind the vehicle are reflected from the uncoated front surface of mirror element 304. As above, reflective mirror element 304 can be formed from soda lime glass and preferably has nonparallel front and rear surfaces, the rear surface being preferably coated with a highly reflective silver/chromium metal layer or other reflective surface. Alternately, a clear plastic material such as polycarbonate or acrylic may be used to form prismatic mirror element 304. Scatterproofing/shatterproofing layer 306 is preferably formed from R101, a styrene butadiene rubber (SBR) polymer mentioned above concerning layer 16, and is adhered to the rear surface of mirror element 304 to prevent scattering of glass fragments and shards in the event of glass breakage during an accident or the like. Alternately, an adhesive tape could also be used for layer 306.

Formed in the area between back wall 320 and the top portion of peripheral side wall 322 at the rear of case 302 is a plug receptacle 370 including a plug opening 372 adapted to receive plug connection 312 when the mirror assembly is connected to a vehicle electrical system is explained more fully below. Opening 372 includes a notch or recess 374 therein, for receiving a latch member on the plug connection 312 as explained below.

Figure 34:
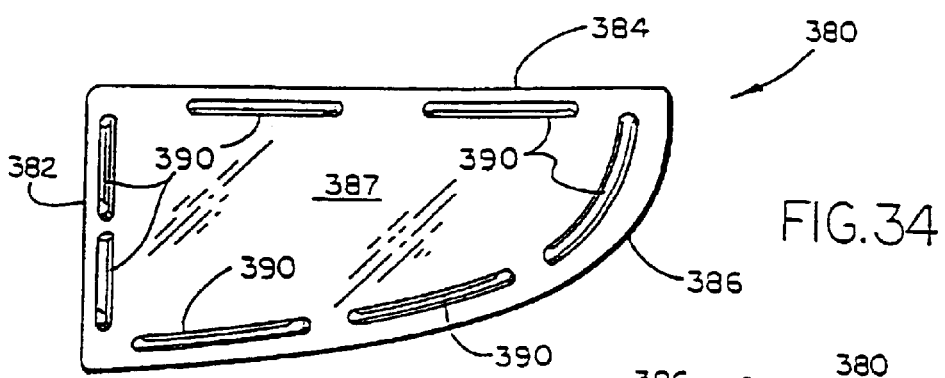
FIG. 34 is a plan view of one of the lenses used in the assembly of FIG. 32 showing the exterior surface thereof.
Figure 35:
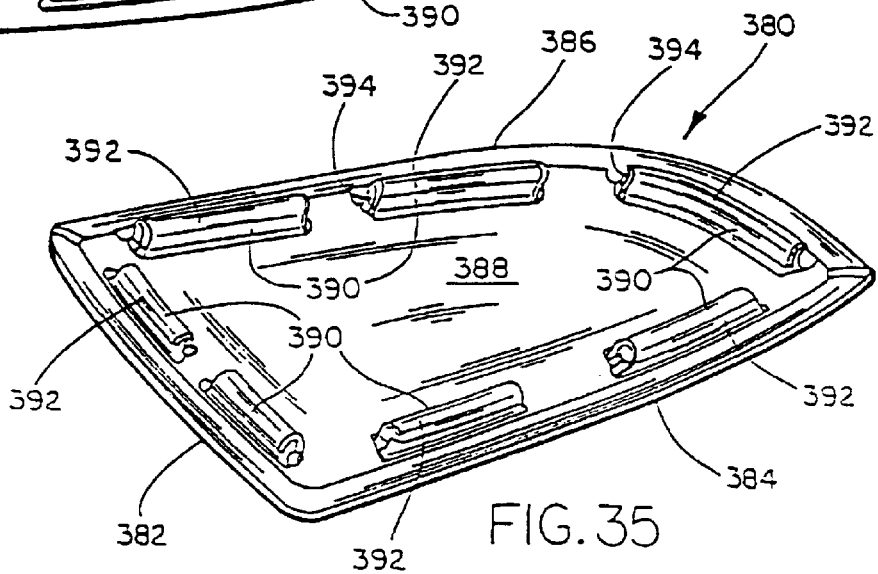
FIG. 35 is a perspective view of the interior side of the lens shown in FIG. 34.

As shown in FIGS. 34–36, lenses 380 are preferably formed in corresponding, but mirror image, left and right hand versions, only one of which will be described in detail herein. Each lens 380 is contoured to fit the complex curvature of the side and rear wall portions where lens openings 318 are formed in case 302 and includes rectilinear edges 382, 384 extending at right angles to one another and a curved edge 386. Each lens has a slightly convex outer surface 387 with its interior surface 388 being slightly concave and having stippling thereon forming a lightly frosted surface for defusion of light from bulbs 130 when the lamps are operated. Preferably, lenses 380 are formed from Dow 303 Caliber Polycarbonate. Lenses 380 are held in openings 318 by retaining flanges 390 which extend along but are spaced inwardly from edges 382, 384, and 386 on the inner surface 388 of each lens. Retaining flanges 390 each include an outwardly extending, formed retaining lip 392 defining a retaining shoulder 394 thereunder adapted to engage the adjacent edge of lens opening 318. Each of the retaining flanges 390 is somewhat resilient such that the curved outer surface of lip 392 allows each flange to engage the edge of opening 318 upon insertion and be cammed slightly inwardly such that shoulder 394 will snap over the adjacent edge. As shown in FIG. 36, a notch 319 is formed in the curved edge of each opening 318 in order to allow insertion of a screwdriver blade or similar tool to pry lenses 380 outwardly for removal.

As best seen in FIGS. 37–42, the integrated sub-assembly module or carrier member 310 preferably is a molded, thermoplastic, resinous, polymeric support body 400 having a generally rectangular shape with its length greater than its height and a thickness preferably within the range of 0.08 to 0.25 inches and, more preferably, of 0.08 to 0.15 inches. A stamped, metallic, wire or bus bar circuit member 402 is separately formed and preferably insert molded within carrier member support body 400 such that the circuit member is at least partially incased and/or encapsulated therein with selected electrical contacts projecting from this support body.

Figure 37:
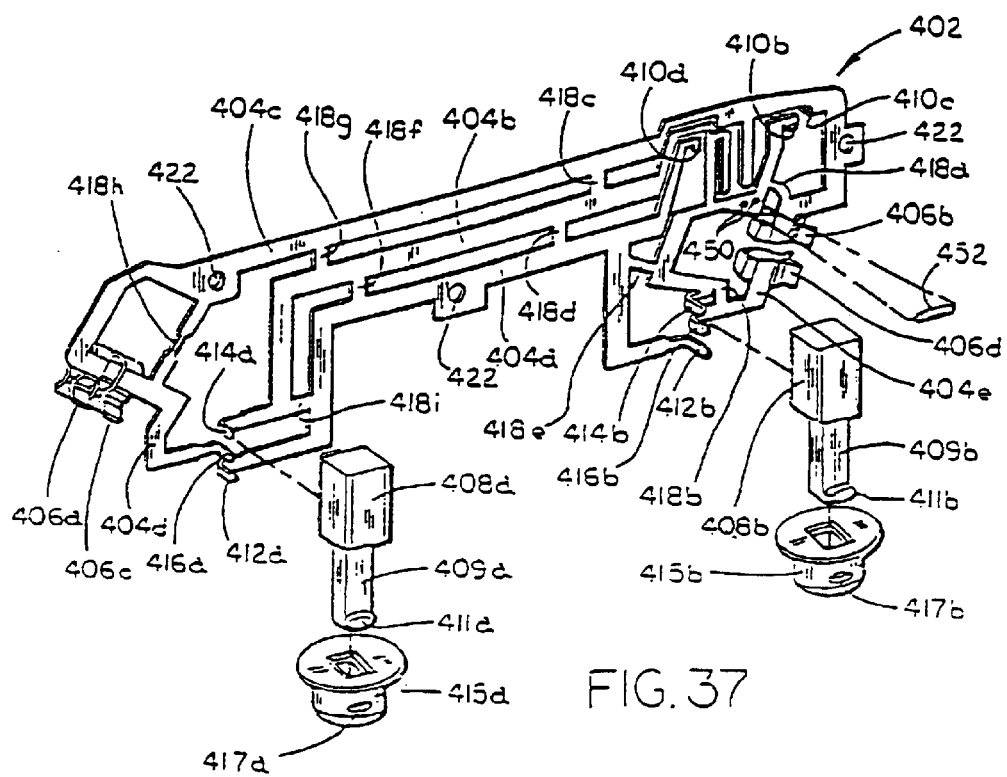
FIG. 37 is an exploded, perspective view illustrating the forward side of the circuit member of the mirror assembly of FIG. 32 prior to encapsulation in the carrier member along with the preferred switches and a diode for mounting on the circuit member.
Figure 38:
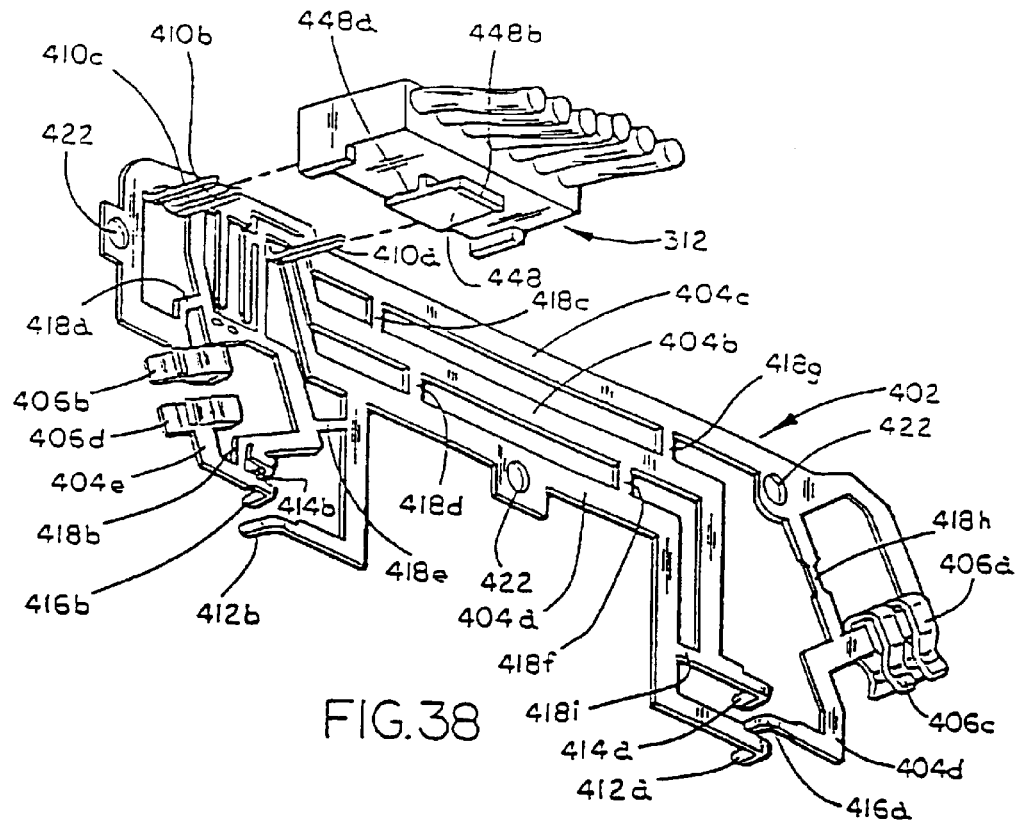
FIG. 38 is a perspective view of the rear side of the circuit member of the mirror assembly of FIG. 32 illustrating the mounting of a plug connector from a vehicle electrical system.

As is best seen in FIGS. 37 and 38, circuit member 402 is preferably stamped from metal such as brass or UNS-C26000 ¾ hard brass having a thickness of about 0.025 inches to include a series of bus strips 404 which extend and distribute electricity to two sets or pairs of bulb holders 406 and electrical switches 408 from electrical connections 410. Alternately, rigid or flexible metallic wire could also be used. Bus member 404a extends from electrical plug connection 410a to switch contacts 412a, 412b forming one side of the electrical connection for each of two separate switches 408a, 408b. A separate bus strip 404b extends from electrical connection 410b to switch contacts 414a and 414b. A third bus member 404c extends from electrical connection 410c to bulb holders 406a and 406b which form one side of each of the two sets of clip type bulb holders or receptacles 406. A fourth bus trip 404d extends from switch contact 416a to bulb holder 406c, while a fifth bus member 404e extends from switch contact 416b to bulb holder 406d. Preferably, switches 408a, 408b are single pole, double throw switches with an additional off position. Electricity from plug connections or contacts 410a, 410b, 410c is directed through switches 408a, 408b selectively to bulb holder sets 406a, 406c and 406b, 406d holding separate lamps or light bulbs 130. Preferably, circuit member 402 is formed with integral punch-out or knock-out plugs 418a, 418b, 418c, 418d, 418e, 418f, 418g, 418h, and 418i which are removed following insert molding of the circuit member within support body 400 by punches extended through the support body to form openings or apertures 420a, 420b, 420c, 420d, 420e, 420f, 420g, 420h and 420i which correspond to the location of the punch-out or knock-out plugs and, therefore, form the electrically isolated bus strips or members 404a, 404b, 404c, 404d, and 404e. Bulb holders 406 and electrical contacts 410, 412, 414 and 416 are preferably formed by bending in progressive dies.

Preferably, as shown in FIGS. 32 and 37, switches 408a, 408b are telescoped over electrical connections 412a, 414a, 416a and 412b, 414b, and 416b such that plungers 409a, 409b extend downwardly through switch apertures 368a, 368b, respectively, when carrier member 310 is mounted in case 302. Plungers 409 are adapted to be depressed to operate the switches and thus the lamps/bulbs 130 connected to the circuit member 402. Each plunger preferably includes a projection 411a, 411b (FIG. 37) adapted to receive a symbol or other indicia indicating the operation of the switch. In addition, each switch plunger receives a flanged cap 415a, 415b, respectively, telescoped thereover such that each projection 411 is visible through its aperture 417a or 417b in cap 415a or 415b to allow visibility of the symbol on projections 411 by a viewer using the mirror assembly in a vehicle. Preferably, each switch 408a, 408b is a single pole, double throw switch having a third "off" position sold by CW Industries of South Hampton, Pa.

In addition, circuit member 402 includes locating holes 422 at three places which extend through the molded support body 400 and are created by locating pins in the mold which remain in place during encapsulation and are removed after molding. The positions of locating holes 422 are offset from one another and asymmetrical to prevent incorrect positioning of the circuit member within the mold.

As is best seen in FIGS. 39–42, support body 400 is preferably molded to include a pair of recesses 424, 426 at opposite ends of the carrier member. Recesses 424, 426 are each defined by a contoured edge which extends into the support body and around a respective set of bulb holders 406a, 406c, or 406b, 406d. When so positioned within the recesses 424, 426, each set of bulb holders extends at an angle to a vertical line extending from top to bottom across the support body and also to a line from the top to bottom of the mirror case when the carrier member 310 is mounted therewithin. The support body is also molded to include a series of recesses 428a, b, c, and d spaced along its top edge and 430a, b, c and d spaced along its bottom edge. Recesses 428 each have an inclined surface which faces upwardly and rearwardly when the support body and carrier member is mounted within mirror housing/case 302. Recesses 430 each have an inclined surface which faces downwardly and rearwardly when carrier member 310 is mounted, and are adapted to receive and mate with slots 330 on the lower portions of interior walls 328 within the mirror case 302. Recesses 428 and the inclined surfaces therein are adapted to engage and facilitate the camming of the upper edge of the support body into the upper slots 330 in the upper edge of internal walls 328 after the lower edge of the support body is placed in lower slots 330. Support body 460 is thereafter rotated rearwardly into the position shown in FIG. 46 during such rotation, the inclined surfaces in recesses 428 engage with camming surfaces 332 and similar rounded surfaces on the upper ends of interior walls 360, 362. In addition, the lower edge of the support body includes a pair of spaced projections 432 which are immediately adjacent the innermost recesses 430b and 430c and, therefore, abut interior walls 328b and 328c when the carrier member is positioned within housing 302. Projections 432 help to prevent lateral shifting of the carrier member within the case as aided by the engagement of recesses 428 and 430 with the slots 330 in interior walls 328 and walls 360, 362.

Figure 39:
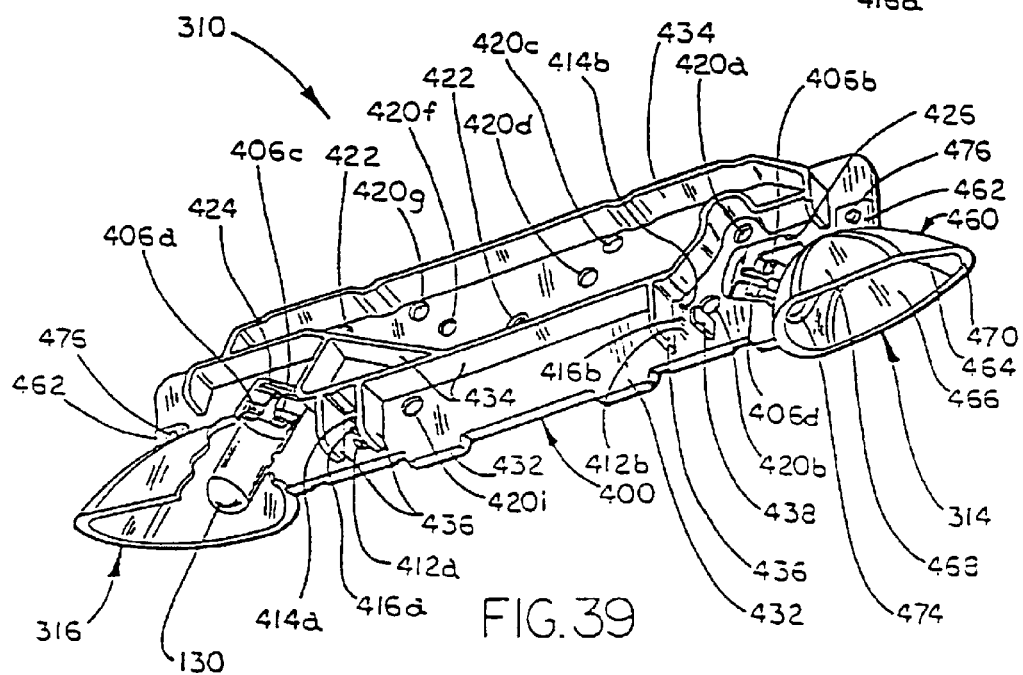
FIG. 39 is a perspective view of the carrier member of the mirror assembly of FIG. 32 showing the forward side which faces the reflective mirror element with portions of one of the reflector housings broken away to reveal the mounting of a bulb therein.
Figures 40, 41, 42:
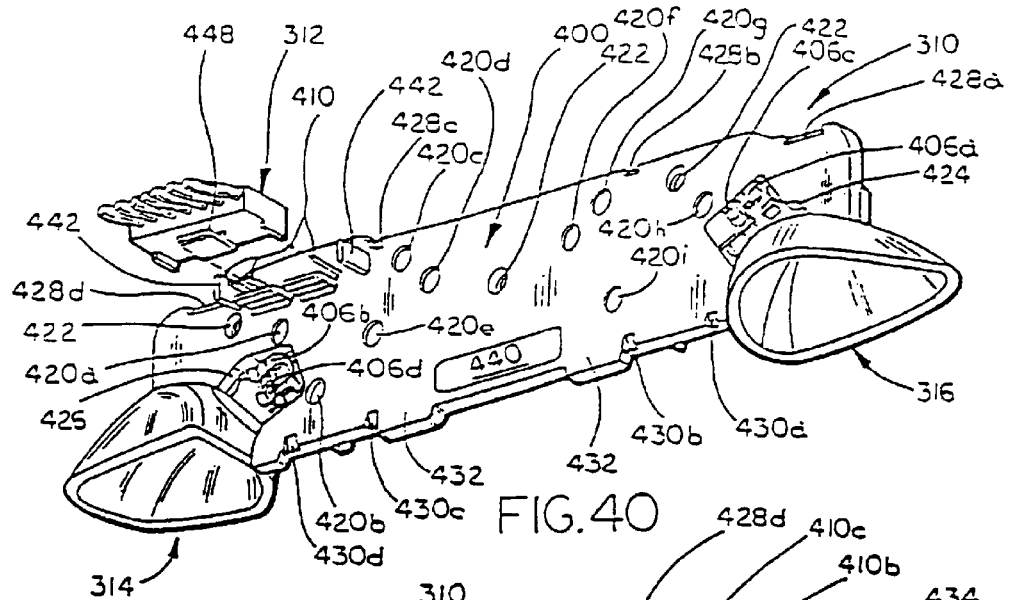
FIG. 40 is a perspective view of the carrier member shown in FIG. 39 showing the rear side and illustrating the mounting of a plug connector from a vehicle electrical system.
FIGS. 41 and 42 are fragmentary, perspective views of the carrier member shown in FIG. 40 illustrating the mounting of the plug connector from the vehicle electrical system.

As is best seen in FIGS. 39 and 40, support body 400 also includes a series of spaced, outwardly projecting, interconnected ribs 434 on its forwardly facing surface. Ribs 434 extend longitudinally along the support body surface, and adjacent and around recesses 424, 426. Ribs 434 which strengthen, reinforce and rigidify the carrier member, reduce motion of the carrier member when plug connector 312 is inserted into the plug connection of the mirror case, distribute load upon any impact received on the carrier member, and help restrict light leakage from bulbs 130 throughout the interior of the mirror housing/case 302. In addition, as shown in FIGS. 43, 45 and 46, ribs 434 help locate the carrier member within the mirror case and prevent snap out after assembly while helping to assure full and proper seating of the prismatic, reflective mirror element with the case. Specifically, in the event carrier member 310 is not properly seated with recesses 428, 430 in slots 330 in interior walls 328, mirror element 304 will not be properly received within the case due to the projection of the ribs out of their normal position.

Support body 400 also includes downwardly extending rib sections 436 and a separate locating flange 438. Rib sections 436 are spaced from one another and from flange 438 to define switch receiving areas around the two sets of switch connections 412a, 414a, 416a and 412b, 414b and 416b as described above. When mounted within the mirror housing/case 302, ribs 434 and rib sections 436 and flange 438 extend forwardly toward the rear surface of the mirror element 304. On the opposite or rear side of the support body 400 on carrier member 310 is a stop surface or engagement area 440 adapted to be contacted by the lower edge of spring bar 350 on toggle actuator 308 to position the actuator during day/night movement of the mirror case as described above. Preferably, stop area 440 extends at a slight incline to the plane of the carrier member as shown in FIG. 43 for flush engagement with the toggle actuator. In addition, the rear surface of support body 400 also includes a pair of spaced locating flanges 442 on either side of the area from which plug connections 410a, b and c extend outwardly. Flanges 442 help locate and position plug connector 312 when inserted into the rear of the mirror assembly through recess 370 and opening 372. Also integrally molded with the carrier member support body are a pair of securing flanges or latch members 444 at the lower margin of the area surrounding plug connections 410. Each latch member 444 includes an outer, terminal edge defining an undercut shoulder 446 providing a latch surface adapted to engage a pivotable keeper 448 on plug connector 312. Keeper 448 includes a latch surface with an undercut shoulder 448a at its inner end, and has an outer end 448b adapted to be pressed with thumb or finger pressure toward connector 312 causing movement of inner end 448a toward and away from connector 312 to allow engagement or disengagement with latch members 444. Thus, when plug connector 312 is aligned with and telescoped over plug connections 410, shoulder 448a on keeper 448 is pivoted outwardly via end 448b to receive securing flanges 444. Shoulder end 448a engages shoulders 446 to prevent removal of the plug connector until end 448b is again pressed downwardly toward the plug connector to release the securing shoulder from the retaining shoulders 446 and securing flanges 444.

Preferably, carrier member 310 is an insert molded assembly like carrier member 20. Circuit member 402 is preformed and located by pins within a suitable mold cavity, while support body 400 is molded therearound to partially encase and/or encapsulate the circuit member within the support body such that the various electrical connections and bulb holders project from the support body. Like carrier 20, the preferred material for support body 400 of carrier member 310 is a melt-processible, thermoplastic material such as nylon and preferably a glass and/or mineral-filled nylon such as 25 percent glass-filled nylon which is heat resistant, relatively rigid when formed and non-electrically conductive such as Zytel™ available from E.I. DuPont Nemours and Co. of Wilmington, Del. The preferred process is injection molding, although compression molding, extrusion molding, reaction injection urethane molding, or casting of the support body about the circuit member 402 can also be used. Like carrier member 20, circuit member 402 is capable of carrying electricity of greater than one (1) amp such that the electricity is conducted and distributed from a connection to an external electrical source to the various electrical components on carrier member 310, such as lamps, switches, controls, instruments, or the like. Other variations in formation of the support body described above in connection with carrier member 20 may also be used with carrier member 310 including the incorporation of a receptacle for connection of a PC circuit board for various alternative functions within the vehicle after mounting of the mirror assembly.

As shown in FIGS. 37 and 38, circuit member 402 may also include a pair of apertures 450 adapted to receive wire connectors from a diode 452 soldered therein. Preferably, diode 452 (FIG. 37) is commercially available under trade number IN4004 having a voltage rating of 16 volts which reduces or prevents electrical current leakage from the circuit member 402 to prevent battery drain when the mirror assembly 300 is electrically connected to the electrical system of the vehicle in which it is mounted via plug connector 312.

Referring now to FIGS. 32, 39, 40 and 42, the configuration and mounting of reflectors 314, 316 will be understood. Reflectors 314, 316 are preferably molded from a high temperature resistant (i.e., greater than 100° C. preferred), thermoplastic, melt-processible resinous, polymeric, plastic material, preferably a polyester material such as polybutylene terephthalate (PBT), although other polymeric materials may also be used. Each reflector is substantially similar although including a slightly different shape depending on the area of the vehicle intended to be illuminated. For references purposes, reflector 314 is described, although it should be understood that reflector 316 includes substantially the same elements. Reflector 314 includes a curved, hollow, bulbous reflector body 460 having an integral mounting flange 462 projecting upwardly from its top surface. Body 460 includes curved wall portions 464 which extend from one end around the top surface to the other end and a pair of opposed, generally parallel wall sections 466, 468 forming truncated sides on opposed portions of the bulbous body. Truncated walls 466, 468 are adapted to fit within the confined spaced between mirror element 304 and rear wall 320 of case 302, and extend generally parallel to mirror element 304 when mounted in case 302. The lower periphery 470 of the molded reflector lies in a plane and defines a generally elongated profile. An aperture 474 extends through curved wall portions 464 to receive bulb 130 therethrough when mounted in bulb holders 406 (FIG. 39). Reflector 314 has a generally elliptical profile except for truncated wall portions 466, 468 so that light is directed both downwardly and to one side of the mirror assembly for illumination of the lap or seat area of the passenger side of the front seat of a vehicle. Reflector 316 directs light downwardly and toward the driver lap or seat area of the vehicle front seat. Preferably, both the inner and outer surfaces of reflector 314, 316 are vacuum metalized, the inner surface having a high gloss to provide a highly specular, shiny reflective surface which efficiently directs light rays downwardly and in the intended directions from bulb 130.

As is best seen in FIGS. 39, 40 and 42, mounting flange 462 from each reflector is fitted over a molded stud or post 476 extending outwardly from the front surface of support body 400. Stud 376 is preferably sonic welded or heat staked to retain flange 462 against the front surface of the carrier member, although suitable adhesives could also be used. When mounted in this manner on studs 476, reflectors 314, 316, respectively, are supported and engaged by the edges of recesses 426, 424, respectively, for secure retention and prevention of vibration of the reflector on the carrier member. This manner of attachment also allows selection and interchangeability of the bulbous reflectors as desired during manufacture depending on the direction and location of the area to which the light from bulbs 130 is to be directed, for example to accommodate left or right-hand drive vehicles. Preferably, bulbs 130, when mounted in bulb holders 406 project through apertures 474 such that approximately 4 millimeters of the bulb filament extends into the hollow interior of the reflector.

Assembly of the modular rearview mirror assembly 300 will now be understood. A preassembled toggle actuator assembly including toggle actuator 308 and the desired type of mirror support arm and mounting bracket is inserted within the previously molded mirror case 302 by inserting the arm and bracket through opening 348 from the interior of the case toward the rear of the case. Toggle actuator 308 is then slide into position such that pivot axle 342 is engaged with recesses or journals 338 in wall 336. Pivot lever 356 projects through aperture 334 during this operation. In addition, upper pivot axle 340 is inserted in the journal recesses 339 at the top of the case. Next, carrier member 310 is preassembled after molding to encapsulate circuit member 402 therein by mounting reflectors 314, 316 over studs 476 and sonic welding or heat staking the same to retain the reflectors in their supported positions against the edges of the recesses 424, 426. Thereafter, bulbs 130 are inserted through apertures 474 into bulb holders 406 and electrical switches 408 are telescoped onto the electrical connections on the front side of the carrier member.

Following preparation of the modular carrier member 310 as described above, that subassembly is inserted within the housing/case 302 by placing the lower edge of the carrier member into the slots 330 in interior walls 328 such that plungers 409 and caps 415 on switches 408 extend through apertures 368. Thereafter, the top edge of the carrier member is rotated through front opening 326 toward the rear of the case such that the inclined surfaces of recesses 428 engage wall surfaces 332 following which further pressure snaps the carrier member into place in the slots 330 at the top of walls 328, as shown in FIG. 46.

All of the above is preferably accomplished by preassembling the carrier members 310 prior to molding of the case 302. The toggle actuator 308 and preassembled carrier member 310 are assembled within the case shortly after the case is removed from its mold and while the case material is still warm and somewhat flexible. Following insertion of the carrier member, the prismatic mirror element 304 including resilient backing 306 is inserted into the case by dropping its lower edge into the area behind lip 324 and again rotating the upper edge toward the rear of the case with pressure such that the mirror element snaps through the front opening 326 into the position shown in FIGS. 43–46. Thereafter, lenses 380 may be snapped in place in openings 318 and the mirror assembly is ready for installation. Once installed on a vehicle, plug connector 312 need only be inserted through recess 370 and opening 372 until keeper 448 engages latch members 444 to hold the plug connector in place over electrical connectors 410. Thereafter, the toggle actuator may be operated by lever 356 to rotate the mirror assembly between day and night positions, as shown in FIG. 43 to reflect varying amounts of reflected light to the eye of the viewer as desired.

Preferably, plug connector 312 establishes electrical connections to the vehicle electrical system such that lamp bulbs 130 will operate in response to switches 408 either when a vehicle occupant desires light or when a door of the vehicle is opened. Hence, switches 408a, 408b, which each control one of the bulbs 130, may be operated via plungers 409a, 409b to illuminate continuously, or only when a door is opened, or not at all.

It is also possible to incorporate low level console or instrumentation lighting for vehicles in assemblies 10, 150, 170, 270, or 300 by fitting a low level, non-incandescent, light emitting light source such as a light emitting diode on any of carrier members 20, 20', 190, 20", or 310 for illumination through openings in cases, 12, 12', 172, 272, or 302 as disclosed in co-pending, commonly-assigned U.S. patent application Ser. No. 08/367,844, filed Dec. 30, 1994, by Brent J. Bos et al., now U.S. Pat. No. 5,671,996, the disclosure of which is hereby incorporated by reference herein.

Figure 47:
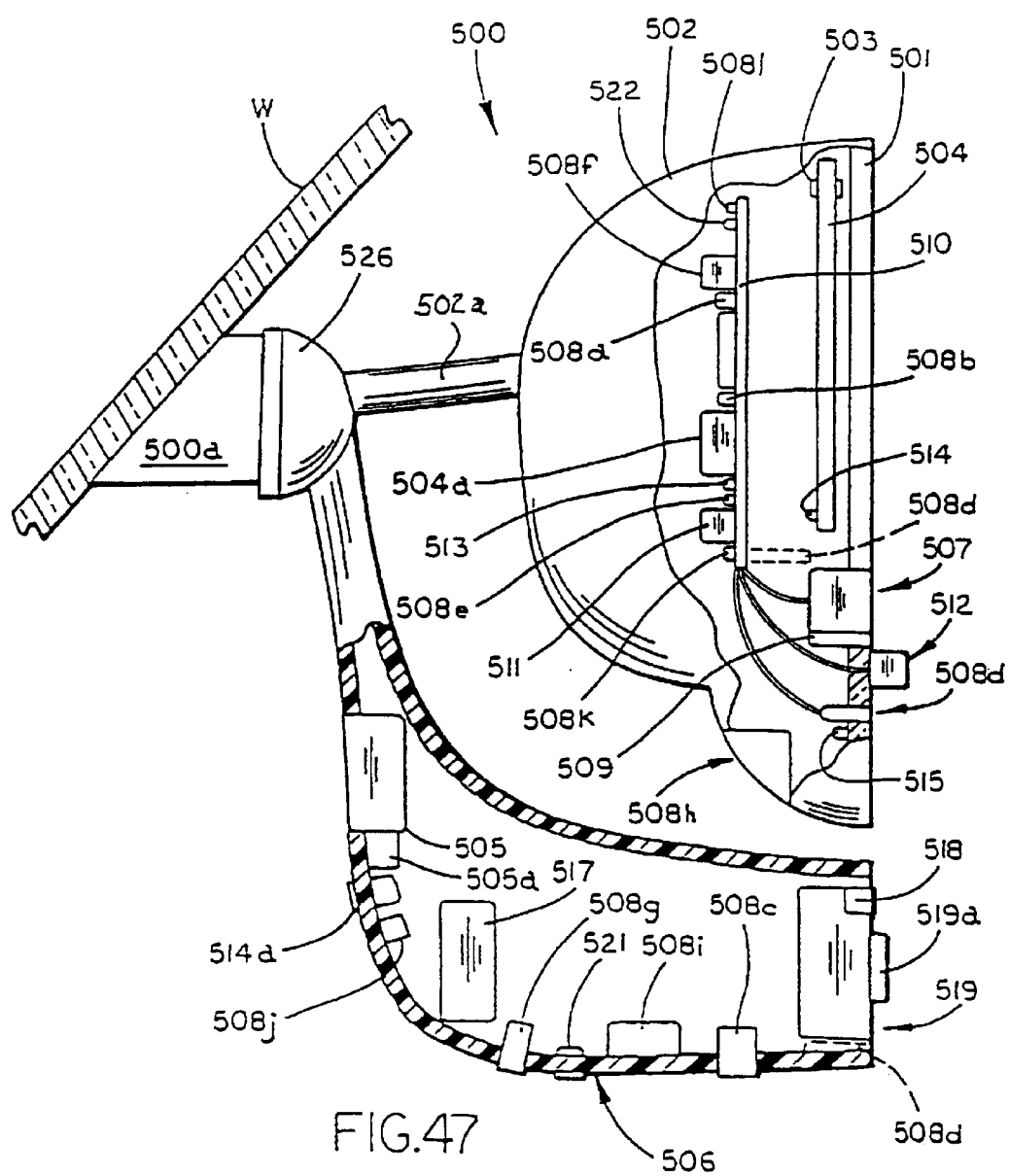
FIG. 47 is a fragmentary sectional elevation of a sixth embodiment of the modular rearview mirror assembly for vehicles of the present invention.

The concepts of this present invention may be used in a variety of automotive rearview mirror assemblies. Referring to FIG. 47, in a sixth embodiment, modular rearview mirror assembly 500 includes a mirror case 502, with a bezel 501 and reflector 504 supported therein, and a pod 506 both of which are mounted to a window button 500a adhered to windshield W by a mirror mount 526. Mirror assembly 500 may optionally include a support 502a, including a fixed or movable support, for mounting case 502 to mirror mount 526. As will be more fully described below, mirror assembly 500 may also include one or more of a plurality of electrical and/or electronic components mounted in or on any one of the components of mirror assembly 500, including case 502, bezel 501, pod 506, mirror mount 526, windshield button 500a, support 502a, and/or carrier member or circuit board 510, and the like. For example, the present invention may include those assemblies described in U.S. patent application Ser. No. 08/799,734, entitled "Vehicle Blind Spot Detection and Display System", invented by Schofield et al. and filed Feb. 12, 1997, now U.S. Pat. No. 5,786,772, the disclosure of which is hereby incorporated herein by reference. A blind spot detection indicator 503 may be positioned in reflector 504. Furthermore, mirror assembly 500 may include a rain sensor 505 mounted, for example, in pod 506. Rain sensor functionality, as is commonly known in the automotive art, is provided in association with an interior rearview mirror assembly. Such association includes utilizing an element of the rearview mirror assembly (such as a plastic housing attached, for example, to the mirror channel mount that conventionally attaches the mirror assembly to a windshield button) to cover a windshield-contacting rain sensor (such as is described in U.S. Pat. No. 4,973,844 entitled "Vehicular Moisture Sensor and Mounting Apparatus Therefor", invented by O'Farrell et al. and issued Nov. 27, 1990, the disclosure of which is hereby incorporated herein by reference), or it may include a non-windshield-contacting rain sensor (such as is described in PCT International Application PCT/US94/05093 entitled "Multi-Function Light Sensor For Vehicle" invented by Dennis J. Hegyl, published as WO 94/27262 on Nov. 24, 1994, the disclosure of which is hereby incorporated by reference herein). Also, a mirror mounted video camera can be used to visually detect the presence of moisture on the windshield, and actuate the windshield wipers accordingly, such as is described in co-pending U.S. patent application Ser. No. 08/621,863, filed Mar. 25, 1996, entitled VEHICLE HEADLIGHT CONTROL USING IMAGING SENSOR, by Schofield et al., now U.S. Pat. No. 5,796,094, which is hereby incorporated by reference herein.

Modular rearview mirror assembly 500 may also include one or more displays 507 which may be mounted on one or more of the assembly components as noted above. Displays 507 may perform a single display function or multiple display functions, such as providing indication of an additional vehicle function, for example a compass mirror display function, a temperature display function, status of inflation of tires display function, a passenger air bag disable display function, an automatic rain sensor operation display function, telephone dial information display function, highway status information display function, blind spot indicator display function, or the like. Such display may be an alpha-numerical display or a multi-pixel display, and may be fixed or scrolling. Such an automatic rain sensor operation display function may include a display function related to rain sensor 505 for both a windshield-contacting and a non-windshield-contacting rain sensor, including, for example, where the circuitry to control rain sensor 505 and other electrical and/or electronic devices, including electrochromic dimming circuitry 504a of a variable reflectance electrochromic mirror, bulb holders, and switches, are commonly housed in or on rearview mirror assembly 500 and wholly or partially share components on common carrier member or circuit board 510. Circuit board 510 may be of the type described in the present invention, such as a carrier member 310 incorporating a circuit member 402. Display 507 may alternate between display functions by a display toggle which may be manually operated, time-shared, voice-actuated, or under the control of some other sensed function, such as a change in direction of the vehicle or the like. Should a rain sensor control circuitry 505a be associated with, incorporated in, or coupled to interior rearview mirror assembly 500, rain sensor control circuitry 505a, in addition to providing automatic or semi-automatic control over operation of the windshield wipers (on the front and/or rear windshield of the vehicle), may be adapted to control the defogger function to defog condensed vapor on an inner cabin surface of a vehicle glazing (such as the inside surface of the front windshield, such as by operating a blower fan, heater function, air conditioning function, or the like), or rain sensor control circuitry 505a may be coupled to a sunroof to close the sunroof or any other movable glazing should rain conditions be detected.

As stated above, it may be advantageous for the rain sensor control circuitry 505a (or any other feature such as a head-lamp controller, a remote keyless entry receiver, a cellular phone including its microphone, a vehicle status indicator and the like) to share components and circuitry with other components and/or control circuitry, for example with an electrochromic mirror function control circuitry and an electrochromic mirror assembly itself. Also, a convenient way to mount a non-windshield-contacting rain sensor such as described by Hegyl is by attachment, such as by snap-on attachment, as a module to the mirror channel mount such as is described in U.S. Pat. No. 5,576,687 entitled "Mirror Support Bracket," invented by R. Hook et al. and issued Nov. 19, 1996, the disclosure of which is hereby incorporated by reference herein. The mirror mount and/or windshield button may optionally be specially adapted to accommodate a non-windshield-mounting rain sensor module. Such mounting as a module is readily serviceable and attachable to a wide variety of lighted and unlighted interior mirror assemblies (both electrochromic and non-electrochromic such as prismatic, manually adjusted mirror assemblies), and can help ensure appropriate alignment of the non-windshield-mounted variety of rain sensor to the vehicle windshield insofar that the module attached to the mirror mount remains fixed whereas the mirror itself (which typically attaches to the mirror channel mount via a single or double ball joint support) is movable so that the driver can adjust its field of view. Also, should smoke from cigarettes and the like be a potential source of interference to the operation of the non-windshield-contacting rain sensor, then a mirror-attached housing can be used to shroud the rain sensor unit and shield it from smoke (and other debris). Optionally, such ability to detect presence of cigarette smoke can be used to enforce a non-smoking ban in vehicles, such as is commonly requested by rental car fleet operators. Also, when a rain sensor (contacting or non-contacting) is used to activate the wiper on the rear window (rear blacklight) of the vehicle, the rain sensor may be alternatively packaged and mounted with the CHMSL (center high mounted stop light) stop light assembly commonly mounted on the rear window glass or close to it. Mounting of the rain sensor with the CHMSL stop light can be aesthetically appealing and allow sharing of components/wiring/circuitry.

As mentioned above, the concepts of this present invention can be used with interior rearview mirrors equipped with a variety of features, such as a home access transmitter 508a, a high/low (or daylight running beam/low) headlamp controller 508b, a hands-free phone attachment 508c, a video device 508d, such as a video camera, for internal cabin surveillance and/or video telephone function, a remote keyless entry receiver 508e, a compass 508f, a seat occupancy detection 508g, one or more map reading lights 508h, or lamps/bulbs 130 described above, a trip computer 508i, an intrusion detector 508j, and the like. Display 507 may also include a compass/temperature and/or clock display, fuel level display, and other vehicle status and other information displays. Again, such features can share components and circuitry with, for example, electrochromic mirror circuitry 504a and other components of assembly 500 so that provision of these extra features is economical.

Placement of video device 508d (FIG. 47) either at, within, or on the interior rearview mirror assembly (including within or on a module attached to a mirror structure such as the mount that attaches to the windshield button) has numerous advantages. In the illustrated embodiment, video device 508d is located in case 502 and positioned below reflective element 504. For example, locating video device 508d in rearview mirror assembly 500 provides the video device 508d with an excellent field of view of the driver and of the interior cabin in general since the rearview mirror is centrally and high mounted. Also, mirror assembly 500 is at a defined distance from the driver so that focus of the video device is facilitated. Also, if video device 508d is placed on a movable portion of mirror assembly 500, for example case 502, the normal alignment of mirror reflector 504 relative to the driver's field of vision rearward can be used to readily align the video device 508d to view the head of the driver. Since many interior rearview mirrors, such as the lighted mirrors of the present invention, are electrically serviced, placement of video device 508d at, within, or on the rearview mirror assembly can be conventionally and economically realized, with common sharing of components and circuitry by, for example, compass 508f (which may include a flux gate sensor, a magneto-resistive sensor, a magneto-inductive sensor, or a magneto-capacitive sensor), a bulb holder for light 508h or bulbs 130, switches, an electrical distribution busbar such as circuit member 402, a display, such as display 507, and electrochromic dimming mirror circuitry 504a. Although the driver is likely the principal target and beneficiary of video device 508d, the lens of video device 508d can be mechanically or electrically (i.e., via a joystick) adjusted to view other portions/occupants of the vehicle cabin interior. In this regard, the joystick controller that adjusts the position of the reflector on the outside rearview mirrors can, optionally, be used to adjust the video device field of view as well. Preferably, video device 508d is fixedly mounted in the mirror case 502, for example on carrier member 510 and connected to a circuit member such as 402 with the lens of video device 508d positioned for viewing through bezel 501. Alternately, video device 508d maybe mounted in a gondola type protrusion/attachment/module below the mirror housing (but mechanically attached thereto so the camera field of vision moves in tandem with movement of the mirror housing). Alternately, video device 508d may be mounted in pod 506 attached to the mirror mount 526 or on windshield button 500a (with the camera lens facing rearward in the vehicle and generally facing the driver). Video device 508d may comprise a CCD camera or a CMOS based video microchip camera, such as is described in commonly owned, co-pending, U.S. patent application Ser. No. PCT/US94/01954, filed Feb. 25, 1994, published Sep. 1, 1994, as WO 94/19212, the disclosure of which is hereby incorporated by reference herein. For operation at night, the internal cabin of the vehicle may optionally be illuminated with non-visible radiation, such as near-infrared radiation, with video device 508d being responsive to the near-infrared radiation so that a video telephone call can be conducted even when the interior cabin is dark to visible light, such as at night.

Also, video device 508d, which is preferably mounted at, within, or on the inner rearview mirror assembly (such as within the mirror case 502 or in pod 506, which is attached to mirror mount 526), may be adapted to capture an image of the face of a potential driver and then, using appropriate image recognition software, decide whether the driver is authorized to operate the vehicle and, only then, enable the ignition system to allow the motor of the vehicle be started. Use of such a mirror-mounted video device (or a digital still camera) enhances vehicle security and reduces theft. Further, video device 508d may be adapted to monitor the driver while he/she is driving and, by detection of head droop, eye closure, eye pupil change, or the like, determine whether the driver is becoming drowsy/falling asleep, and then to activate a warning to the driver to stay alert/wake up.

It is beneficial to use a microprocessor to control multiple functions within the interior mirror assembly and/or within other areas of the vehicle (such as the header console area), and such as is described in Irish Patent Application Serial No. 970014, entitled "A Vehicle Rearview Mirror and A Vehicle Control System Incorporating Such Minor," filed Jan. 9, 1997, published July 15, 1998, the disclosure of which is hereby incorporated by reference herein. Such microprocessor can, for example, control the electrochromic dimming function, a compass direction display, an external temperature display, and the like. For example, a user actuatable switch can be provided that at one push turns on a compass/temperature display, on second push changes the temperature display to metric units (i.e., to degrees Celsius), on third push changes to Imperial units (i.e., degrees Fahrenheit) and on fourth push turns off the compass/temperature display, with the microprocessor controlling the logic of the display. Alternately, a single switch actuation turns on the display in Imperial units, the second actuation changes it to metric units, and third actuation turns the display off. Further, the displays and functions described herein can find utility also on outside rearview mirrors. For example, a transducer 508k that receives and/or transmits information to a component of an intelligent highway system (such as is known in the automotive art) can be incorporated into an interior and/or outside rearview mirror assembly and, preferably, mounted to common circuit board or carrier member 510. Thus, for example, a transmitter/receiver 508l for automatic toll booth function could be mounted at/within/on an outside sideview mirror assembly. Preferably, transmitter/receiver 508l is also mounted to common circuit board or carrier member 510. A digital display of the toll booth transaction can be displayed by display 507. Optionally, a micro printer 509 may be incorporated within rearview mirror assembly 500 which can print a receipt or record of the transaction. In the illustrated embodiment, printer 509 is shown mounted in case 502, but it should be understood, as with most of the other components, that it can be mounted in a variety of locations on mirror assembly 500. Similarly, for safety and security on the highways, GPS information, state of traffic information, weather information, telephone number information, and the like may be displayed and transmitted/received via transducers located at, within, or on an interior rearview mirror assembly and/or an outside sideview mirror assembly.

Also, interior rearview mirror assembly 500 may optionally include an Internet Interface circuit 511 to provide a link to the Worldwide Web. Circuit 511 may be coupled to a modem/cellular phone or cell phone control panel 512 mounted within the vehicle, and preferably, mounted at, within or on the interior rearview mirror assembly 500. Thus, the driver or passenger can interact with other road users, can receive/transmit messages including E-mail, can receive weather and status of highway traffic/conditions, and the like, via a mirror located interface to the INTERNET.

Further, a trainable garage door opener 513, including a universal garage door opener such as is available from Prince Corporation, Holland, Mich. under the tradename HOMELINK™, or a transmitter 514 for a universal home access system that replaces the switch in a household garage that opens/closes the garage door with a smart switch that is programmable to a household specific code that is of the rolling code type, such as is available from TRW Automotive, Farmington Hills, Mich. under the tradename KWIKLINK™, may be mounted at, within, or on interior mirror assembly 500 (or, if desired, an outside sideview mirror). Switches to operate such devices (typically up to three separate push type switches, each for a different garage door/security gate/household door) can be mounted on mirror assembly 500, preferably user actuatable from the front face of the mirror case 502 or pod 506. Preferably, the universal garage door opener HOMELINK™ unit or the universal home access KWIKLNK™ unit is mounted at, within, or on interior rearview mirror assembly 500. Optionally, such a unit could be mounted at, within or on an outside sideview mirror assembly.

The KWIKLINK™ printed circuit board can be mounted within the mirror housing (optionally adhered to a shock absorber comprising a double-sticky tape anti-scatter layer on the rear of the reflector element (prismatic or electrochromic) such as is described in U.S. Pat. No. 5,572,354 entitled "Rear Mirror Assembly", invented by J. Desmond et al. and issued Nov. 5, 1996, the disclosure of which is hereby incorporated by reference herein or may be accommodated within pod 506, such as the detachable pod module described in U.S. Pat. No. 5,576,687 entitled "Mirror Support Bracket", invented by R. Hook et al. and issued Nov. 19, 1996, the disclosure of which is hereby incorporated by reference herein, and with the detachable module attached to the mirror mount or to the mirror button. Mounting the KWIKLTNK™ unit in a detachable module has advantages, particularly for aftermarket supply where a battery operated KWIKLINK™ unit can be supplied within a pod housing (with the necessary user actuatable button or buttons mounted on the pod and with the battery being readily serviceable either by access through a trap door and/or by detaching the pod from the mirror mount). By supplying a battery-operated, stand-alone, snap-on, detachable KWLKLINK™ mirror mount pod, the KWLKLINK™ home access system can be readily and economically provided to a broad range of mirrors including non-electrical mirrors such as base prismatic mirrors, and electrical mirrors such as unlighted and lighted mirrors (including prismatic and electrochromic types) and electro-optic mirrors, such as electrochromic mirrors. Further, a solar panel 514a may be installed on the pod housing to recharge the battery.

Also, pod 506 may have a windshield button mount attached thereto or incorporated therein and have, in addition, a structure that replicates the windshield button standard on most vehicles manufactured in the United States. Thus, when a consumer purchases such an aftermarket product, the consumer simply removes the existing interior rearview mirror assembly from the windshield button it is attached to in the vehicle. Then, the consumer attaches a pod module windshield button mount of the type shown in U.S. Pat. No. 4,930,742, the disclosure of which is hereby incorporated by reference herein, to the windshield button attached to the windshield (this can be achieved either by sliding on and securing with a screwdriver, or by snap-on in a manner conventional in the mirror mounting art). Finally, the consumer now attaches the rearview mirror assembly to the windshield button replication structure that is part of the aftermarket pod module. Since the windshield button shape is largely an industry standard (but the interior rearview mirror mount that attaches thereto is typically not standard), by using this "button on a button" pod module design, an aftermarket product (such as a pod module incorporating one or more electrical and/or electronic devices, including the home access transmitter, universal garage door opener, security monitor such as a pyroelectric intrusion detector (such as disclosed in copending U.S. patent application Ser. No. 08/720,237 filed Sep. 26, 1996, the disclosure of which is hereby incorporated by reference herein), remote keyless entry receiver, and compass, as described previously, and the like, may be readily installed by the vehicle owner, and the existing rearview mirror assembly can be readily remounted in the vehicle.

Interior mirror assembly 500 may further include a cellular phone 515 incorporated into interior mirror assembly 500 with its antenna, optionally, incorporated into the outside sideview mirror assembly or into inside rearview mirror assembly 500. Such mounting within the mirror assemblies has several advantages including that of largely hiding the cellular phone and antenna from ready view by a potential thief. Furthermore, seat occupancy detector 508g may be coupled to an air bag deployment/disable monitor, which can be located at, within or on the interior rearview mirror assembly 500. Seat occupancy detector 508g may comprise a video microchip or CCD camera seat occupancy detector, an ultrasonic detector, a pyroelectric detector, or anyone or more of their combination. Moreover, where more than one rearview mirror is being controlled or operated, or when several vehicle accessories are linked to, for example, an electrochromic interior or outside mirror, interconnections can be multiplexed, as is commonly known in the automotive art. Moreover, where it is desired to display external outdoor temperature within the interior cabin of the vehicle, a temperature sensor (such as a thermocouple or thermistor) can be mounted at, within or on an outside sideview mirror assembly (for example, it can protrude into the slipstream below the lower portion of the sideview mirror housing in a manner that is aesthetically and styling acceptable to the automakers and to the consumer) and with the temperature sensor output connected, directly or by multiplexing to display 507 or a separate display (such as a vacuum fluorescent display) located in the interior cabin of the vehicle.

Preferably, the external temperature display is located at, within or on the interior rearview mirror assembly, optionally in combination with another display function such as a compass display (see U.S. patent application Ser. No. 08/799,734, entitled "Vehicle Blind Spot Detection System" invented by K. Schofield et al., and filed Feb. 12, 1997, now U.S. Pat. No. 5,786,772), or as a stand-alone pod such as pod 506 as a module to a mirror support member (see U.S. Pat. No. 5,576,687). Most preferably, the interior and outside mirror assemblies are supplied by the same supplier, using just-in-time sequencing methods, such as is commonly known in the automotive supply art and as is commonly used such as for supply of seats to vehicles. Just-in-time and/or sequencing techniques can be used to supply a specific option (for example, the option of configuring an external temperature display with a base prismatic interior mirror, or with a base electrochromic interior mirror, or with a compass prismatic interior mirror, or with a compass electrochromic interior mirror) for an individual vehicle as it passes down the vehicle assembly line. Thus, the automaker can offer a wide array of options to a consumer from an option menu. Should a specific customer select an external temperature display for a particular vehicle due to be manufactured by an automaker at a particular location on a specific day/hour, then the mirror system supplier sends to the vehicle assembly plant, in-sequence and/or just-in-time, a set of an interior rearview mirror assembly and at least one outside sideview mirror assembly for that particular vehicle being produced that day on the assembly line, and with the outside sideview mirror equipped with an external temperature sensor and with the interior rearview mirror assembly equipped with an external temperature display. Such just-in-time, in-sequence supply (which can be used for the incorporation of the various added features recited herein) is facilitated when the vehicle utilized a car area network such as is described in Irish Patent Application No. 970014 entitled "A Vehicle Rearview Mirror and A Vehicle Control System Incorporating Such Mirror", application date Jan. 9, 1997, the disclosure of which is hereby incorporated by reference herein, or when multiplexing is used, such as is disclosed in U.S. patent application Ser. No. 08/679,681 entitled "Vehicle Mirror Digital Network and Dynamically Interactive Mirror System", invented by O'Farrell et al., and filed Jul. 11, 1996, now U.S. Pat. No. 5,798,575, the disclosure of which is hereby incorporated by reference herein. Also, given that an interior electrochromic mirror can optionally be equipped with a myriad of features (such as map lights, reverse inhibit line, headlamp activation, external temperature display, remote keyless entry control, seat occupancy detector such as by ultrasonic, pyroelectric or infrared detection, and the like), it is useful to equip such assemblies with a standard connector (for example, a 10-pin parallel connector) such as electrical connections 410 for receiving a plug connector 312 as described above, so that a common standard wiring harness can be provided across an automaker's entire product range. Naturally, multiplexing within the vehicle can help alleviate the need for more pins on such a connector, or allow a given pin or set of pins control more than one function.

The concepts of this present invention can be further utilized in added feature interior rearview mirror assemblies including those that include a loudspeaker (such as for a vehicle audio system, radio or the like, or for a cellular phone including a video cellular phone). Such loudspeaker may be a high frequency speaker that is mounted at, within, or on the interior rearview mirror assembly 500 (such as within the mirror case 502 or attached as a module-type pod to the mirror mount such as is described above and as shown as loudspeaker 517 in FIG. 47) and with its audio output, preferably, directed towards the front windshield of the vehicle so that the windshield itself at least partially reflects the audio output of the speaker (that preferably is a tweeter speaker, more preferably is a compact (such as about 1"×1"×1" in dimensions or smaller), and most preferably utilizes a neodymium magnet core) back into the interior cabin of the vehicle. Interior rearview mirror assembly 500 may also include a microphone 518 and a digital (or a conventional magnetic tape) recorder 519 with its associated circuitry 519a, which can be used by vehicle occupants to record messages and the like. Display 507 may be adapted to receive paging information from a pager 521, which may be incorporated in interior rearview mirror assembly 500, for example, in pod 506, and that displays messages to the driver (preferably via a scrolling display) or to other occupants. Interior rearview mirror assembly 500 may include a digital storage device 522, which stores information such as phone numbers, message reminders, calendar information, and the like, that can, automatically or on demand, display information to the driver.

The concepts of this present invention can be utilized in a variety of prismatic and electrochromic compass mirrors (both lighted and unlighted mirrors) that display directional information based upon compass sensor 508f (which may comprise a flux gate sensor, a magneto-responsive sensor, such as an magneto-resistive sensor, magneto-inductive sensor, or a magneto-capacitive sensor, a hail affect sensor, or an equivalent compass sensor). Alternatively, directional information obtained from a geographic positioning system such as a Global Positioning System (GPS) as is disclosed in co-pending U.S. patent application Ser. No. 08/569,851, filed Dec. 8, 1995, entitled VEHICLE GLOBAL POSITIONING SYSTEM, by O'Farrell et al, now U.S. Pat. No. 5,971,552, the disclosure of which is hereby incorporated by reference herein, could be used to provide the compass direction signal for a mirror mounted display. For instance, a mirror of this invention could utilize as a variable reflective element with an electrochromic solid polymer matrix such as described in co-pending, commonly assigned U.S. patent application Ser. No. 08/824,501, filed on Mar. 27, 1997, now U.S. Pat. No. 5,910,854, the disclosure of which is hereby incorporated by reference. Compass sensor 508f may be mounted anywhere in the vehicle and with its directional signal fed to a digital display, for example display 507, (such as a liquid crystal display, a vacuum fluorescent display, or light emitting diode display, an electro luminescent display, or the like) that is mounted at/in/on interior rearview mirror assembly 500. In another example, compass sensor 508f may be mounted in the dashboard or in the header region close to the roof of the vehicle. Compass sensor 508f may also be mounted at interior rearview mirror assembly 500 by placement within pod 506 that fixedly mounts sensor 508f to mirror assembly support 526, which attaches interior mirror assembly 500 to windshield button mount 500a, and as is described in U.S. Pat. No. 5,530,240 to Larson et al. and in U.S. Pat. No. 5,576,687 entitled "Mirror Support Bracket", referred to above. In the illustrated embodiment, however, compass sensor 508f is mounted within case 502 of interior mirror assembly 500 along with its associated circuitry and any optional map lights (508h) and the like. Mounting of compass sensor 508f within the housing of the interior mirror assembly (as an alternate to placing the compass within pod 506, which may be fixedly attached to mirror support that typically attaches to the front windshield and bracket) has some advantages. For example, by mounting compass sensor 508f within case 502, pod 506 may be eliminated along with the wire harness, which would be required to couple the compass directional signals from sensor 508f in pod 506 to display 507, which is preferably mounted within case 502. Such location of compass sensor 508f within or at case 502 of mirror assembly 500 also means that there is no external evidence of the presence of the sensor, and, thus, aesthetics are potentially enhanced. Also, such placement of sensor 508f within case 502 of mirror assembly 500 (such as schematically shown in FIG. 47) is suitable for header mounted mirrors such as shown in U.S. Pat. No. 5,615,857, the reference to which herein incorporated by reference in its entirety. Most preferably, sensor 508f is in the form of an integrated circuit chip mount (or similar printed circuit board insertable form) so that compass sensor 508f can be placed on circuit board 510 as are preferably the other electrical/electronic components within case 502 of interior mirror assembly 500. By having compass sensor 508f housed within the rearview mirror assembly 500 along with it wholly or partially sharing components, manufacturing and packaging economies are realized. Such housing of compass sensor 508f on common printed circuit board or circuit member 510 along with the other electrical and/or electronic components, for example, any one or more electrical or electronic components described in reference to this and earlier embodiments, including any electrochromic dimming circuitry to automatically dim reflectivity when glare conditions are detected by light sensors, displays, any bulb holders/switches, microprocessors, and their like, further enhances the manufacturing and packaging economies. Since case 502 of mirror assembly 500 is adjustable by the driver to assist his or her needs, a compass sensor 508f within case 502 may have a different orientation from one driver to another, which may result in a relatively mirror inaccuracy in directional information. These inaccuracies, however, are typically unnoticeable and, moreover, may be mitigated by using stabilization means and algorithms, including fuzzy logic, and/or using deviation compensatory means, as are known in the compass art.

Further, where compass and compass/temperature displays such as shown in U.S. Pat. No. 5,786,772 are used, the front plate over the display may be angled relative to the driver's line of sight (between about 2 to 10 and, most preferably, between about 4 to 8 relative to line of sight), so that any headlight glare incident thereon is reflected away from the driver.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by claims which follow.

What is claimed is:

1. An interior rearview mirror assembly for vehicles comprising:
    a reflective mirror element having a front surface for viewing by a user of said mirror assembly and a rear surface;
    a lip formed of a moldable polymeric resin, said polymeric resin selected to expand sufficiently when heated to allow snap-in insertion of said reflective mirror element while said lip is warm and flexible;
    a carrier located to the rear of said reflective element such that said carrier is closer a windshield of a vehicle than said mirror element when said mirror element is mounted in the vehicle;
    at least one electrical accessory, said at least one electrical accessory supported by said carrier and selected from the group consisting of a lamp, a light, a switch, a light sensor, a display, a rain sensor, a variable reflectance mirror dimming circuitry, a defogger control, a headlamp controller, a remote keyless entry receiver, a cellular phone, a microphone, an indicator, a transmitter, a camera, a compass sensor, a seat occupancy detector, a trip computer, an intrusion detector, an intelligent highway system transducer, an automatic toll booth transmitter/receiver, a microprinter, a printer control, an Internet interface, a garage door opener, an antenna, a temperature display, a loudspeaker, a digital recorder, a tape recorder, a pager, a digital storage device, and a microprocessor; and
    said carrier including an electrical connection adapted to receive a connector from the vehicle electrical system, said at least one electrical accessory connected to said electrical connection.

2. The rearview mirror assembly of claim 1 wherein said moldable polymeric resin comprises a polyolefin resin.

3. The rearview mirror assembly of claim 1 wherein said electrical connection on said carrier includes a plurality of plug connections adapted to receive a plug connector from the vehicle electrical system.

4. The rearview mirror assembly of claim 3 including a latch for a connector from the vehicle electrical system.

5. The rearview mirror assembly of claim 1 wherein said carrier includes an electrical circuit, said electrical accessory connected to said electrical circuit.

6. The rearview mirror assembly of claim 5 including a diode connected to said electrical circuit to reduce electrical current from the vehicle electrical system.

7. The rearview mirror assembly of claim 5 wherein said carrier includes an electrically conductive circuit member and a non-electrically conducting support body, said circuit member being formed separately from and secured to said support body, said carrier providing an integral support, electrical connections for, and an electrical distribution network to said at least one electrical accessory, said at least one electrical accessory being connected to said circuit member.

8. The rearview mirror assembly of claim 7 wherein said carrier includes an elongated, plate-like body having a length and height significantly greater than its thickness, said carrier member body including at least one rib projecting outwardly from said body and extending thereon for reinforcing and strengthening said body.

9. The rearview mirror assembly of claim 8 wherein said rib extends along the length of said plate-like body.

10. The rearview mirror assembly of claim 8 wherein said body includes first and second sides, said rib extending along said first side of said body, said second side of said body including said electrical connection; said electrical connection including a plug connection for receiving an electrical plug to connect said circuit member to the vehicle electrical system.

11. The rearview mirror assembly of claim 10 wherein said second side of said body includes a latch member adapted to engage a plug when connected to said plug connection to retain the plug in said plug connection.

12. The rearview mirror assembly of claim 7 wherein said mirror element comprises a prismatic mirror element.

13. The rearview mirror assembly of claim 12 wherein said electrical connection includes a plug connection for connecting said circuit member to the vehicle electrical system.

14. The rearview mirror assembly of claim 13 wherein said assembly further includes a day/night actuator mounted for movement of at least said prismatic mirror element between day and night positions.

15. The rearview mirror assembly of claim 13 wherein said at least one electrical accessory includes a lamp mounted on said carrier, connected to said circuit member, and adapted to provide light to a portion of the vehicle when said mirror assembly is mounted thereon.

16. The rearview mirror assembly of claim 15 wherein said lamp includes a light bulb; said carrier member also including a reflector adapted to reflect light from said light bulb to the vehicle portion, and an electrical switch, said switch connected to said circuit member to control operation of said light bulb.

17. The rearview mirror assembly of claim 16 wherein said reflector includes a bulb-receiving aperture therethrough, said carrier member including a receptacle for mounting said reflector, said light bulb extending at least partially through said bulb-receiving aperture.

18. The rearview mirror assembly of claim 13 wherein said circuit member is a metal stamping;
said carrier being molded therearound from a non-electrically conductive resinous material.

19. The rearview mirror assembly of claim 1 including a switch to control operation of said at least one electrical accessory.

20. The rearview mirror assembly of claim 19 wherein said switch includes a portion having indicia thereon for indicating the switch control function to a user of said mirror assembly.

21. The rearview mirror assembly of claim 20 wherein said switch portion includes a plunger for operating said switch and a cap fitted thereover.

22. The rearview mirror assembly of claim 21 wherein said plunger including an indicia receiving area on which said indicia is placed, said cap including an opening exposing said indicia receiving area to a user of said mirror assembly.

23. The rearview mirror assembly of claim 1 wherein said mirror element comprises an electro-optic mirror element.

24. The rearview mirror assembly of claim 1 wherein said at least one electrical accessory comprises a video camera.

25. The rearview mirror assembly of claim 24 wherein said video camera comprises one of a charge coupled device camera and a CMOS based video microchip camera.

26. The rearview mirror assembly of claim 24 wherein said video camera is adapted for use with a cellular video phone, said camera providing a video output to said cellular video phone.

27. The rearview mirror assembly of claim 1 wherein said at least one electrical accessory comprises a garage door opener.

28. The rearview mirror assembly of claim 1 wherein said at least one electrical accessory comprises a microphone.

29. The rearview mirror assembly of claim 1 wherein said at least one electrical accessory comprises a compass sensor.

30. The rearview mirror assembly of claim 1 wherein said at least one electrical accessory comprises an antenna.

31. The rearview mirror of claim 1 said polymeric resin expanding sufficiently when heated during a molding operation.

32. An interior rearview mirror assembly for vehicles comprising:

a reflective mirror element having a front surface for viewing by a user of said mirror assembly and a rear surface;

a lip formed of a moldable polyolefin resin, said polyolefin resin selected to expand sufficiently when heated to allow snap-in insertion of said reflective mirror element while said lip is warm and flexible;

a carrier located to the rear of said reflective element such that said carrier is closer a windshield of a vehicle than said mirror element when said assembly is mounted in the vehicle;

at least one electrical accessory, said at least one electrical accessory supported by said carrier and selected from the group consisting of a lamp, a light, a switch, a light sensor, a display, a rain sensor, a variable reflectance mirror dimming circuitry, a defogger control, a headlamp controller, a remote keyless entry receiver, a cellular phone, a microphone, an indicator, a transmitter, a camera, a compass sensor, a seat occupancy detector, a trip computer, an intrusion detector, an intelligent highway system transducer, an automatic toll booth transmitter/receiver, a printer control, an Internet interface, a garage door opener, an antenna, a temperature display, a loudspeaker, a digital recorder, a tape recorder, a pager, a digital storage device, and a microprocessor, and an electrical connector adapted to receive a connector from the vehicle electrical system, said at least one electrical accessory connected to said electrical connector, said electrical connector including a plurality of plug connections adapted to receive a plug connector from the vehicle electrical system.

33. The rearview mirror assembly of claim 32 including a latch for a plug connector from the vehicle electrical system.

34. The rearview mirror assembly of claim 32 including a diode connected to an electrical circuit of said rearview mirror assembly.

35. The rearview mirror assembly of claim 32 wherein said carrier is formed separately from and mounted to said case, said carrier including an electrically conductive circuit member and a non-electrically conducting support body, said circuit member being formed separately from and secured to said support body, said carrier providing an integral support, electrical connections for, and an electrical distribution network to said at least one electrical accessory, said at least one electrical accessory being connected to said circuit member.

36. The rearview mirror assembly of claim 35 wherein said at least one electrical accessory is a lamp mounted on said carrier.

37. The rearview mirror assembly of claim 36 wherein said carrier includes an edge portion defining a recess, said circuit member including a bulb holder within said recess, and a reflector secured to said carrier and received in said recess, said recess edge portion engaging and supporting said reflector, said lamp including a bulb mounted within said recess in said bulb holder, said reflector reflecting light from said bulb away from said mirror assembly when said bulb is illuminated.

38. The rearview mirror assembly of claim 37 wherein said carrier includes a second lamp connected to said circuit member.

39. The rearview mirror assembly of claim 38 wherein said carrier includes a second edge portion defining a second recess spaced from the first said recess, said second recess including a second bulb holder therewithin, and a second reflector secured to said carrier and received in said second recess, said second recess edge portion engaging and supporting said second reflector; said second lamp including a second bulb mounted within said second recess in said second bulb bolder, said second reflector reflecting light from said second bulb away from said mirror assembly when said second bulb is illuminated.

40. The rearview mirror assembly of claim 38 wherein said second lamp extends at an angle to the first of said bulbs.

41. The rearview mirror assembly of claim 38 including a pair of switches connected to said circuit member on said carrier to control operation of said first and second lamps, one switch controlling operation of said first lamp, the other of said switches controlling operation of said second lamp.

42. The rearview mirror assembly of claim 35 including a switch to control operation of said at least one electrical accessory.

43. The rearview mirror assembly of claim 35 wherein said carrier includes an elongated, plate-like body having a length and height significantly greater than its thickness, said carrier body including at least one rib projecting outwardly from said body and extending thereon for reinforcing and strengthening said body.

44. The rearview mirror assembly of claim 43 wherein said body includes first and second sides, said at least one rib extending along said first side of said body, said second side of said body including said electrical connector for receiving the electrical plug connector to connect said circuit member to an electrical power source, and a latch member adapted to engage the plug connector when connected to said electrical connector to retain the plug connector in said electrical connector.

45. The rearview mirror assembly of claim 35 wherein said carrier includes a diode connected to said circuit member for reducing current when said assembly is connected to the electrical system for a vehicle.

46. The rearview mirror assembly of claim 32 wherein said at least one electrical accessory comprises a video camera.

47. The rearview mirror assembly of claim 32 wherein said at least one electrical accessory comprises a garage door opener.

48. The rearview mirror assembly of claim 32 wherein said at least one electrical accessory comprises a microphone.

49. The rearview mirror assembly of claim 32 wherein said at least one electrical accessory comprises a compass sensor.

50. The rearview mirror assembly of claim 32 wherein said at least one electrical accessory comprises an antenna.

51. An interior rearview mirror assembly for vehicles comprising:

a reflective mirror element having a front surface for viewing by a user of said mirror assembly and a rear surface;

a lip formed of a moldable polyolefin resin, said polyolefin resin selected to expand sufficiently when heated during a molding operation to allow snap-in insertion of said reflective mirror element while said lip is warm and flexible;

a carrier located to the rear of said reflective element such that said carrier is closer a windshield of a vehicle than said mirror element when said assembly is mounted in the vehicle;

at least one electrical accessory, said at least one electrical accessory supported by said carrier and selected from the group consisting of a lamp, a light, a switch, a light sensor, a display, a rain sensor, a variable reflectance mirror dimming circuitry, a defogger control, a headlamp controller, a remote keyless entry receiver, a cellular phone, a microphone, an indicator, a transmitter, a camera, a compass sensor, a seat occupancy detector, a trip computer, an intrusion detector, an intelligent highway system transducer, an automatic toll booth transmitter/receiver, a printer control, an Internet interface, a garage door opener, an antenna, a temperature display, a loudspeaker, a digital recorder, a tape recorder, a pager, a digital storage device, and a microprocessor, and an electrical connector adapted to receive a connector from the vehicle electrical system, said at least one electrical accessory connected to said electrical connector, said electrical connection including a plurality of plug connections adapted to receive a plug connector from the vehicle electrical system.

52. The rearview mirror assembly of claim 51 including a latch for the plug connector from the vehicle electrical system.

53. The rearview mirror assembly of claim 51 including a diode connected to an electrical circuit of said rearview mirror system.

54. The rearview mirror assembly of claim 51 wherein said carrier is formed separately from and mounted to said case, said carrier including an electrically conductive circuit member and a non-electrically conducting support body, said circuit member being formed separately from and secured to said support body, said carrier providing an integral support, electrical connections for, and an electrical distribution network to said at least one electrical accessory, said at least one electrical accessory being connected to said circuit member.

55. The rearview mirror assembly of claim 54 wherein said at least one electrical accessory is a lamp mounted on said carrier.

56. The rearview mirror assembly of claim 55 wherein said carrier includes an edge portion defining a recess, said circuit member including a bulb holder within said recess, and a reflector secured to said carrier and received in said recess, said recess edge portion engaging and supporting said reflector, said lamp including a bulb mounted within said recess in said bulb holder, said reflector reflecting light from said bulb away from said mirror assembly when said bulb is illuminated.

57. The rearview mirror assembly of claim 56 wherein said carrier includes a second lamp connected to said circuit member.

58. The rearview mirror assembly of claim 57 wherein said carrier includes a second edge portion defining a second recess spaced from the first said recess, said second recess including a second bulb holder therewithin, and a second reflector secured to said carrier and received in said second recess, said second recess edge portion engaging and supporting said second reflector; said second lamp including a second bulb mounted within said second recess in said second bulb holder, said second reflector reflecting light from said second bulb away from said mirror assembly when said second bulb is illuminated.

59. The rearview mirror assembly of claim 57 wherein said second lamp extends at an angle to the first of said lamps.

60. The rearview mirror assembly of claim 57 including a pair of switches connected to said circuit member on said carrier to control operation of said first and second lamps, one switch controlling operation of said first lamp, the other of said switches controlling operation of said second lamp.

61. The rearview mirror assembly of claim 54 including a switch to control operation of said at least one electrical accessory.

62. The rearview mirror assembly of claim 54 wherein said carrier includes an elongated, plate-like body having a length and height significantly greater than its thickness, said carrier body including at least one rib projecting outwardly from said body and extending thereon for reinforcing and strengthening said body.

63. The rearview mirror assembly of claim 62 wherein said body includes first and second sides, said at least one rib extending along said first side of said body, said second side of said body including said electrical connector for receiving the plug connector to connect said circuit member to an electrical power source, and a latch member adapted to engage the plug connector when connected to said electrical connector to retain the plug connector in said electrical connector.

64. The rearview mirror assembly of claim 54 wherein said carrier includes a diode connected to said circuit member for reducing current when said assembly is connected to the electrical system for a vehicle.

65. The rearview mirror assembly of claim 51 wherein said at least one electrical accessory comprises a video camera.

66. The rearview mirror assembly of claim 51 wherein said at least one electrical accessory comprises a garage door opener.

67. The rearview mirror assembly of claim 51 wherein said at least one electrical accessory comprises a microphone.

68. The rearview mirror assembly of claim 51 wherein said at least one electrical accessory comprises a compass sensor.

69. The rearview mirror assembly of claim 51 wherein said at least one electrical accessory comprises an antenna.

* * * * *

UNITED STATES PATENT AND TRADEMARK OFFICE
CERTIFICATE OF CORRECTION

PATENT NO. : 6,877,888 B2
APPLICATION NO. : 10/739766
DATED : April 12, 2005
INVENTOR(S) : Jonathan E. DeLine, Roger L. Veldman and Niall R. Lynam It is certified that error appears in the above-identified patent and that said Letters Patent is hereby corrected as shown below:

(57) ABSTRACT:
Line 6, "flexable" should be --flexible--.
Line 14, "electrical" should be --electronic--.

Column 30:
Line 55, "minor" should be --mirror--.

Column 31:
Line 55, "KWIKLNK™" should be --KWIKLINK™--.
Line 59, Insert --Universal Home Access System (which operates on a rolling code, such as is commonly known in the home/vehicle security art) comprises a vehicle mounted transmitter and a receiver located in the garage, the KWIKLINK™ system is a low-current device that can be, optionally, operated off a battery source, such as a long life lithium battery. It is also compact and lightweight as executed on a single-or double-sided printed circuit board. The KWIKLINK™-- after "KWIKLINK™--.

Column 32:
Line 6, "KWIKLTNK™" should be --KWIKLINK™--.
Line 14, "KWLKLINK™" should be --KWIKLINK™--. in the first occurrence
Line 14, "KWLKLINK™" should be --KWIKLINK™--. in the second occurrence Column 34:
Line 43, "hail" should be --hall--.

Column 35:
Line 49, "mirror" should be --minor--.
Line 58, "2 to 10" should be --2° to 10°--.
Line 59, "4 to 8" should be --4° to 8°--.

Column 38:
Line 7, Claim 31, Insert --,-- after "claim 1".
Line 37, Claim 32, "," should be --;--.

Column 39:
Line 17, Claim 39, "bolder" should be --holder--.

UNITED STATES PATENT AND TRADEMARK OFFICE
CERTIFICATE OF CORRECTION

PATENT NO. : 6,877,888 B2
APPLICATION NO. : 10/739766
DATED : April 12, 2005
INVENTOR(S) : Jonathan E. DeLine, Roger L. Veldman and Niall R. Lynam It is certified that error appears in the above-identified patent and that said Letters Patent is hereby corrected as shown below:

Column 40:
Line 24, Claim 51, "," should be --;--.

Signed and Sealed this

Twenty-eighth Day of August, 2007

JON W. DUDAS
*Director of the United States Patent and Trademark Office*